(12) United States Patent
Miyabe et al.

(10) Patent No.: US 12,051,269 B2
(45) Date of Patent: Jul. 30, 2024

(54) CONTROL METHOD FOR NOTIFICATION SYSTEM, AND NOTIFICATION SYSTEM

(71) Applicant: Panasonic Intellectual Property Corporation of America, Torrance, CA (US)

(72) Inventors: Yoshiyuki Miyabe, Osaka (JP); Motoji Ohmori, Osaka (JP); Hiroki Takeuchi, Osaka (JP); Koji Honda, Kyoto (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 240 days.

(21) Appl. No.: 17/404,422

(22) Filed: Aug. 17, 2021

(65) Prior Publication Data

US 2021/0374389 A1    Dec. 2, 2021

Related U.S. Application Data

(63) Continuation of application No. PCT/JP2020/006391, filed on Feb. 19, 2020.

(60) Provisional application No. 62/809,233, filed on Feb. 22, 2019.

(30) Foreign Application Priority Data

Jun. 25, 2019   (JP) .................................. 2019-117175

(51) Int. Cl.
    *G06V 40/16*    (2022.01)
    *G08B 5/22*     (2006.01)

(52) U.S. Cl.
    CPC ............. *G06V 40/172* (2022.01); *G08B 5/22* (2013.01)

(58) Field of Classification Search
    None
    See application file for complete search history.

(56) References Cited

U.S. PATENT DOCUMENTS

2021/0406820 A1* 12/2021 Yamakawa ............. H04M 9/02
2023/0284590 A1*  9/2023 Bedell .................. A01K 29/005
                                                           119/719

FOREIGN PATENT DOCUMENTS

| JP | 2003-78628   |   | 3/2003  |
|----|--------------|---|---------|
| JP | 2003078628 A | * | 3/2003  |
| JP | 2004-013871  |   | 1/2004  |
| JP | 2004-297570  |   | 10/2004 |
| JP | 2007-310814  |   | 11/2007 |

(Continued)

OTHER PUBLICATIONS

International Search Report (ISR) issued on Jun. 9, 2020 in International (PCT) Application No. PCT/JP2020/006391.

*Primary Examiner* — Delomia L Gilliard
(74) *Attorney, Agent, or Firm* — WENDEROTH, LIND & PONACK, L.L.P.

(57) ABSTRACT

Provided is a control method for a notification system including a notification device located inside a building. The control method includes: (a) obtaining face information of a deliverer of an article from an outside server; (b) obtaining a camera image of a face of a visitor to the building, the camera image being captured by a camera disposed outside the building; (c) verifying whether the visitor is the deliverer by comparing the face information and the camera image; and (d) when the visitor is verified to be the deliverer, notifying, by the notification device, a user of delivery information indicating that the deliverer of the article has arrived at the building.

7 Claims, 24 Drawing Sheets

(56) References Cited

FOREIGN PATENT DOCUMENTS

| | | | |
|---|---|---|---|
| JP | 2007310814 A | * | 11/2007 |
| JP | 2011-77835 | | 4/2011 |
| JP | 2011077835 A | * | 4/2011 |
| JP | 5443110 | | 3/2014 |
| JP | 2015-162750 | | 9/2015 |
| JP | 6246403 | | 12/2017 |
| JP | 6321995 | | 5/2018 |
| JP | 2018-151838 | | 9/2018 |
| JP | 2018151838 A | * | 9/2018 |

* cited by examiner

Fig. 4A

Order information 501

| Order ID | User ID | Item ID | Quantity | Address |
|---|---|---|---|---|
| A001 | B001 | C001 | 1 | XXXX |

Fig. 4B

Delivery request information 502

| Receipt ID | User ID | Item ID | Quantity | Address |
|---|---|---|---|---|
| D001 | B001 | C001 | 1 | XXXX |

Fig. 4C

Receipt information 503

| Receipt ID | Order ID | User ID | Item ID | Quantity |
|---|---|---|---|---|
| D001 | A001 | B001 | C001 | 1 |

Fig. 4D

Delivery details information 504

| Receipt ID | Delivery company ID | Expected delivery date and time | Deliverer's face information |
|---|---|---|---|
| D001 | E001 | 2018/10/30 11:00 | XXXX |

Fig. 4E

Delivery status information 505

| Receipt ID | Order ID | User ID | Item ID | Quantity | Delivery company ID | Expected delivery date and time | Deliverer's face information | Status |
|---|---|---|---|---|---|---|---|---|
| D001 | A001 | B001 | C001 | 1 | E001 | 2018/10/30 11:00 | XXXX | Not yet arrived |
| D002 | A002 | B001 | C002 | 2 | E002 | 2018/10/30 13:00 | XXXX | Not yet arrived |
| D003 | A003 | B001 | C003 | 1 | E001 | 2018/10/25 10:00 | XXXX | Already arrived |

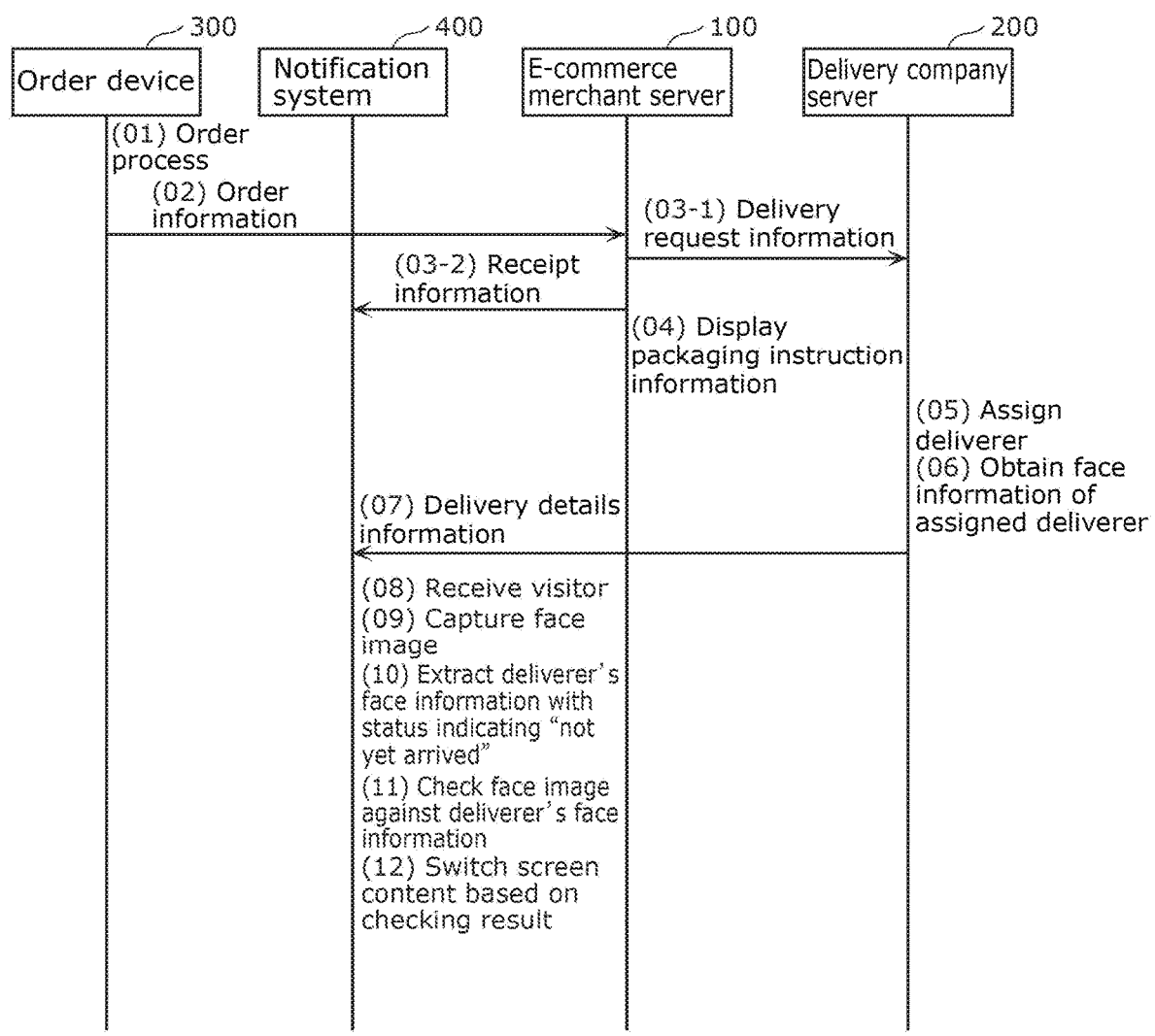

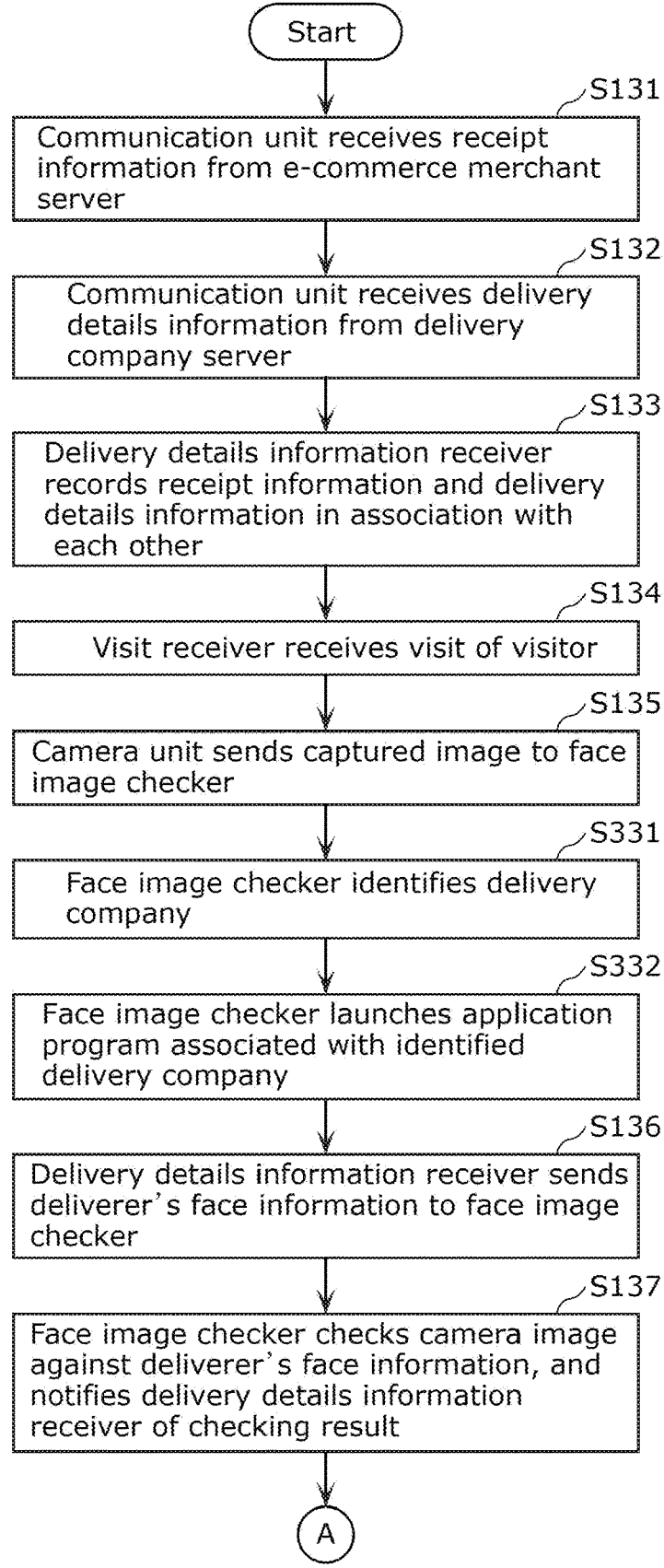

CONTROL METHOD FOR NOTIFICATION SYSTEM, AND NOTIFICATION SYSTEM

CROSS REFERENCE TO RELATED APPLICATIONS

This is a continuation application of PCT International Application No. PCT/JP2020/006391 filed on Feb. 19, 2020, designating the United States of America, which is based on and claims priority of U.S. Provisional Patent Application No. 62/809,233 filed on Feb. 22, 2019 and Japanese Patent Application No. 2019-117175 filed on Jun. 25, 2019. The entire disclosures of the above-identified applications, including the specifications, drawings and claims are incorporated herein by reference in their entirety.

FIELD

The present disclosure relates to a notification system and a control method of the notification system which notifies a user of delivery information indicating that a deliverer who delivers an article to a building has been arrived at the building.

BACKGROUND

Conventionally, there is technology that displays, on a display terminal in a building, an image captured by a camera installed in an entrance of the building. For example, an intercom system disclosed in Patent Literature (PTL) 1 queries a package delivery company server about a deliverer to improve security against impersonation of the deliverer belonging to the package delivery company (for example, see PTL 1: Japanese Patent No. 6321995).

SUMMARY

Technical Problem

However, in the foregoing conventional technology, a face photo of a visitor is sent to the package delivery company server, and thus the privacy of the visitor is not adequately protected.

In view of above, the present disclosure provides a control method for a notification system, and the like, which is capable of improving security against a visitor who pretends a deliverer and protecting the privacy of a visitor.

Solution to Problem

A control method for a notification system according to one aspect of the present disclosure is a control method for a notification system including a notification device located inside a building. The control method includes: (a) obtaining face information of a deliverer of an article from an outside server; (b) obtaining a camera image of a face of a visitor to the building, the camera image being captured by a camera disposed outside the building; (c) verifying whether the visitor is the deliverer by comparing the face information and the camera image; and (d) when the visitor is verified to be the deliverer, notifying, by the notification device, a user of delivery information indicating that the deliverer of the article has arrived at the building.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

A control method for a notification system according to one aspect of the present disclosure is capable of improving security against a visitor who pretends a deliverer and protecting the privacy of a visitor.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4A illustrates one example of order information according to Embodiment 1.

FIG. 4B illustrates one example of delivery request information according to Embodiment 1.

FIG. 4C illustrates one example of receipt information according to Embodiment 1.

FIG. 4D illustrates one example of delivery details information according to Embodiment 1.

FIG. 4E illustrates one example of delivery status information according to Embodiment 1.

FIG. 5 is a sequence diagram of the entire system including the notification system according to Embodiment 1.

FIG. 19 is a flow chart illustrating the processing of a notification system according to Embodiment 4.

DESCRIPTION OF EMBODIMENTS

Hereinafter, certain exemplary embodiments are described in greater detail with reference to the accompanying Drawings.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the appended Claims and their equivalents. Therefore, among the elements in the following exemplary embodiments, those not recited in any one of the independent claims are described as optional elements. Moreover, the figures are schematic illustrations and not necessarily precise illustrations. In the figures, substantially identical components are assigned the same reference signs, and overlapping descriptions thereof may be omitted or simplified.

Embodiment 1

[Usage Example]

Figure 1:
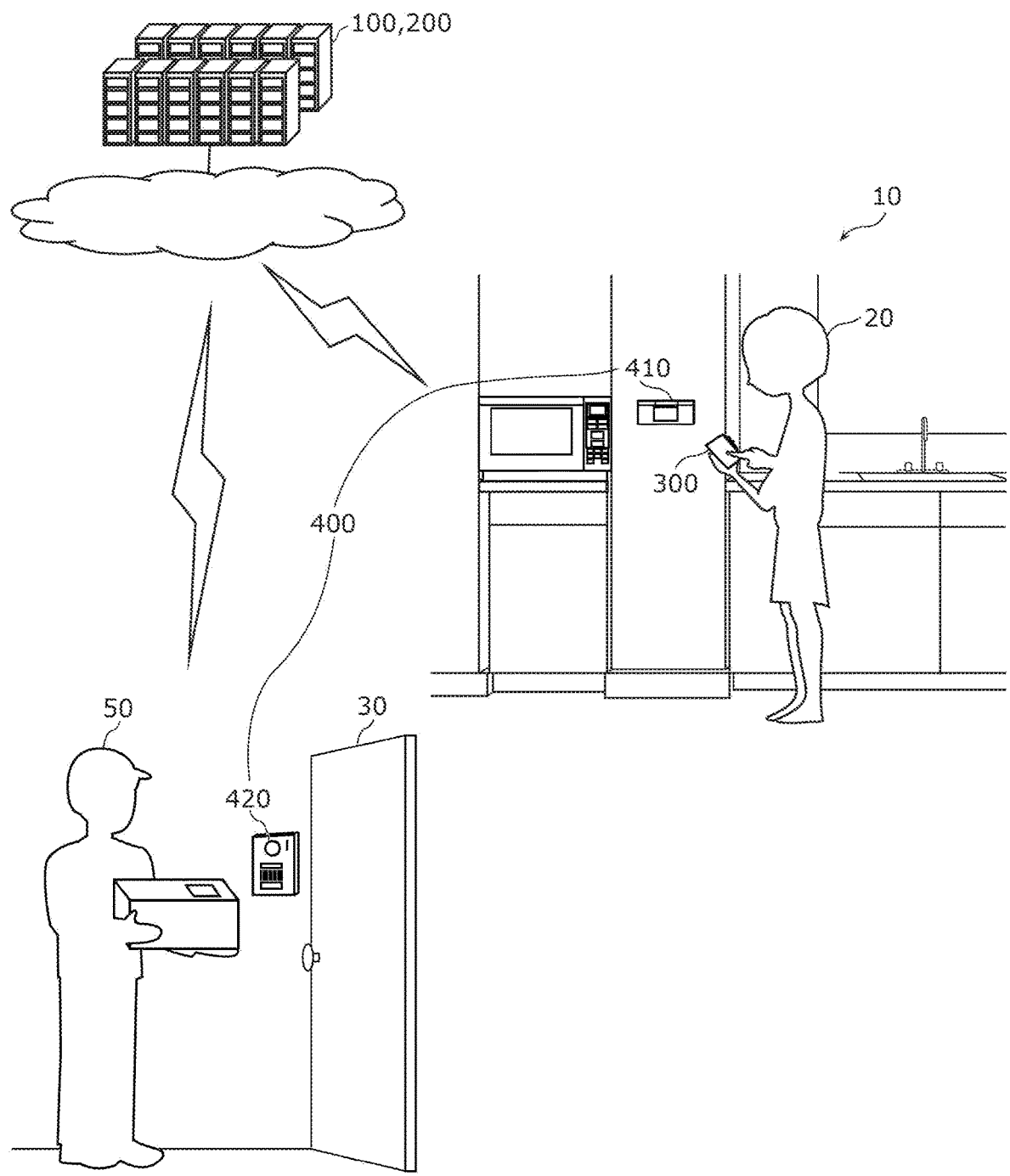
FIG. 1 illustrates a usage example of a notification system according to Embodiment 1.

Firstly, a usage example of notification system 400 according to Embodiment 1 will be described with reference to FIG. 1. FIG. 1 illustrates the usage example of notification system 400 according to Embodiment 1.

Notification system 400 according to the present embodiment is used in building 10 which is a house of user 20. It is to be noted that building 10 need not be limited to a house. Any building structure which a deliverer visits to deliver an article is possible. For example, building 10 may be an apartment, a store, an office, or the like.

In FIG. 1, notification system 400 includes notification device 410 and intercom device 420. Notification device 410 and intercom device 420 are communicably connected to each other.

Notification device 410 verifies whether or not visitor 50 is a deliverer, and notifies user 20 of delivery information according to the verification result. In other words, notification device 410 determines whether the captured image of visitor 50 satisfies a predetermined condition, and notifies user 20 of delivery information according to the determination result. Notification device 410 is located inside building 10, and fixed to a wall, a floor, or a ceiling of building 10, for example. It is to be noted that notification device 410 may be portable.

Intercom device 420 is disposed outside building 10, and located near entrance 30 of building 10, for example. Intercom device 420 receives the visit of visitor 50 to building 10, and captures a face image of visitor 50. Intercom device 420 can be used to talk with a person through notification device 410 in building 10.

In general, an intercom refers to a telephone for localized use in the building structure. Accordingly, the intercom device may refer to a device including equipment outside the building structure and equipment inside the building structure. However, in the present disclosure, the "intercom device" is used as the term mainly referring to equipment outside the building structure.

Order device 300 sends an order to a merchant on electronic commerce. Order device 300 is used by user 20, and for example, a smartphone, a tablet computer, a laptop computer, a desk top computer, or any combination of smartphones, tablet computers, laptop computers, or desk top computers is used as order device 300.

[Functional Configuration of Entire System Including Notification System]

Figure 2:
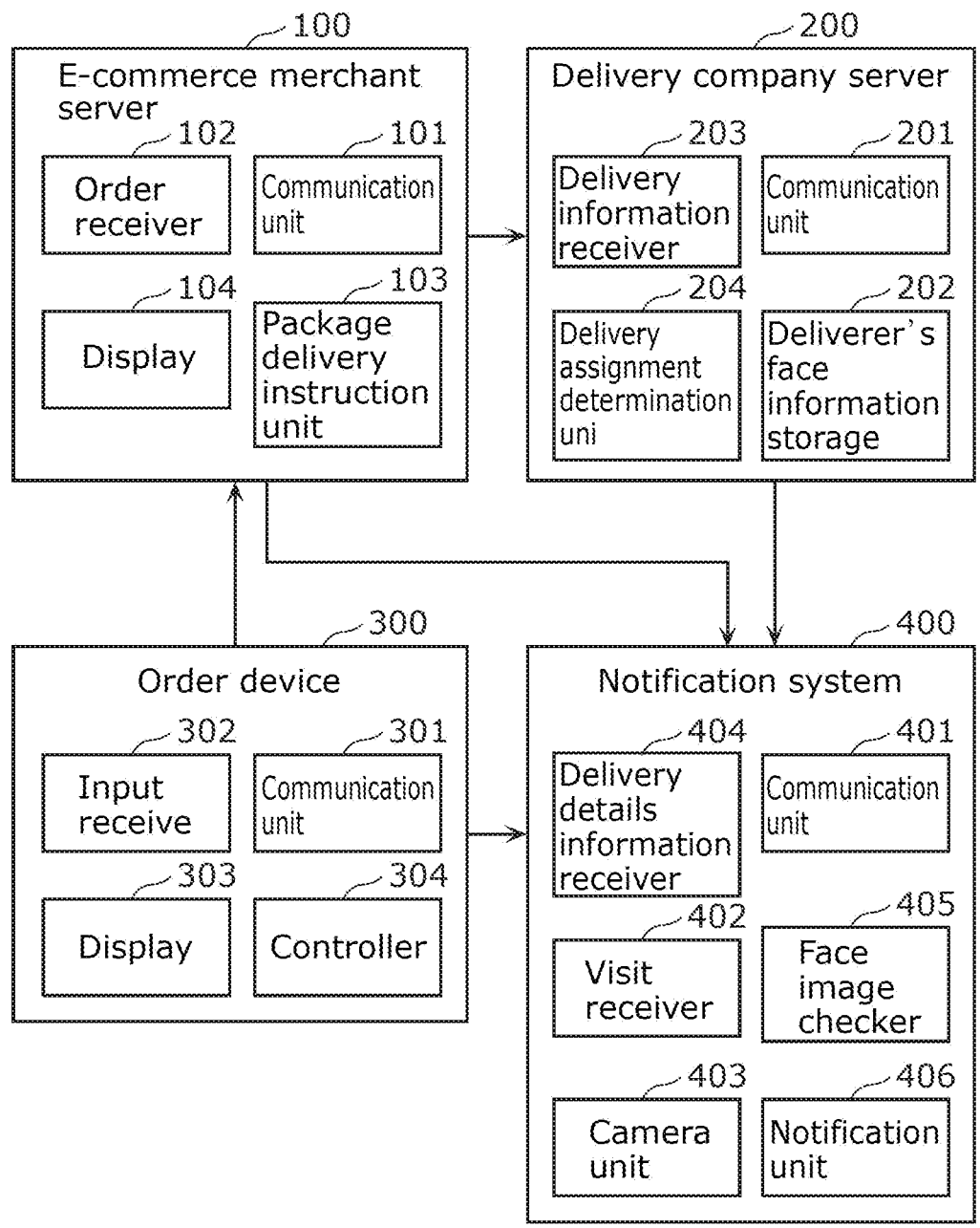
FIG. 2 is a block diagram illustrating the functional configuration of the entire system including the notification system according to Embodiment 1.
Figure 3:
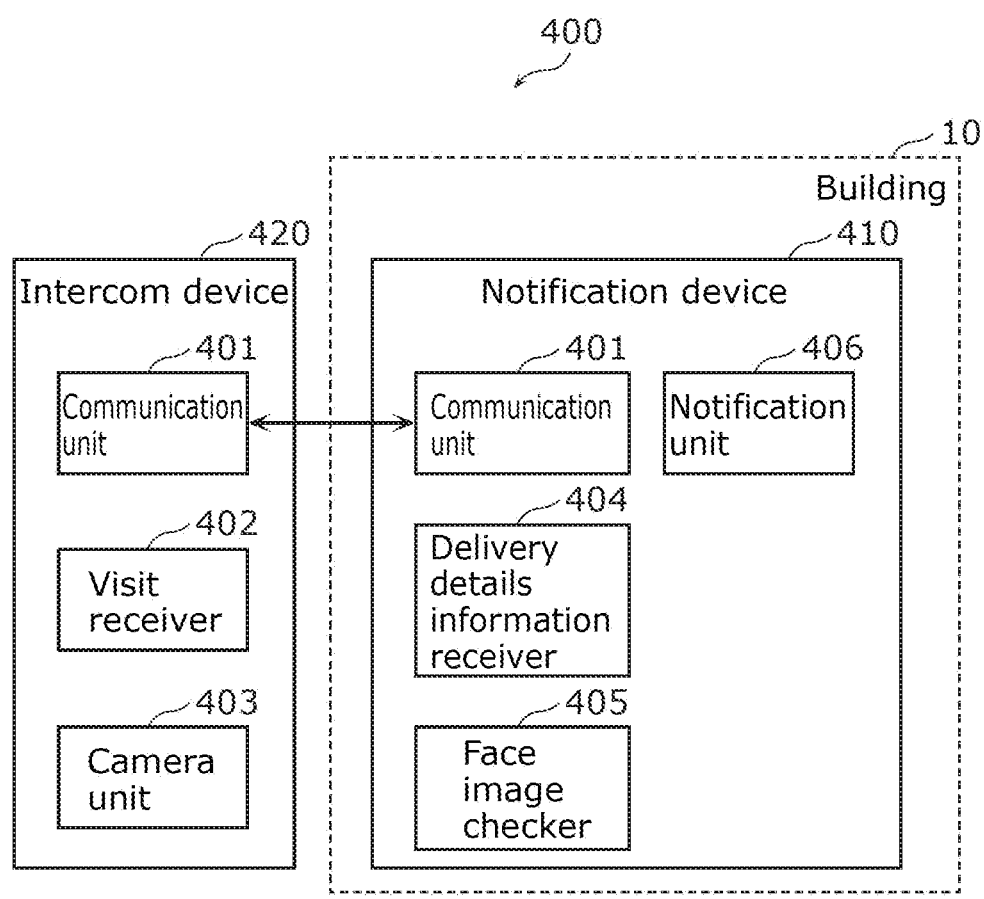
FIG. 3 is a block diagram illustrating the functional arrangement of the notification system according to Embodiment 1.

Here, the functional configuration of the entire system including notification system 400 and an outside server will be described with reference to FIG. 2 through FIG. 4E. FIG. 2 is a block diagram illustrating the functional configuration of the entire system including notification system 400 according to Embodiment 1. FIG. 3 is a block diagram illustrating the functional configuration of notification system 400 according to Embodiment 1. FIG. 4A through FIG. 4E illustrates one example of order information 501, delivery request information 502, receipt information 503, delivery details information 504, and delivery status information 505, respectively.

As shown in FIG. 2, e-commerce merchant server 100, delivery company server 200, and order device 300 are communicably connected to notification system 400.

[Functional Configuration of E-commerce Merchant Server 100]

Firstly, the functional configuration of e-commerce merchant server 100 will be described with reference to FIG. 2, and FIG. 4A through FIG. 4C. E-commerce merchant server 100 is one example of the outside sever. As shown in FIG. 2, e-commerce merchant server 100 includes communication unit 101, order receiver 102, package delivery instruction unit 103, and display 104.

Communication unit 101 is implemented by, for example, a wired and/or wireless communication circuit. Communication unit 101 receives order information 501 from order device 300 via a communication network. For example, Internet, wide area network (WAN), local area network (LAN), or any combination thereof can be used as the communication network.

As shown in FIG. 4A, order information 501 includes order ID for identifying an order, user ID for identifying an orderer, item ID for identifying an item in the order, the quantity of the item in the order, and shipping address. It is to be noted that order information 501 shown in FIG. 4A is one example, and any other information is also possible. For example, order information 501 may further include the name of the item in the order.

Furthermore, communication unit 101 sends delivery request information 502 to delivery company server 200 via a communication network. As shown in FIG. 4B, delivery request information 502 includes receipt ID for identifying receipt of order (i.e., order receipt), user ID for identifying an orderer, item ID for identifying an item in the order, the quantity of the item in the order, and shipping address. It is to be noted that delivery request information 502 shown in FIG. 4B is one example, and any other information is also possible. For example, the quantity may be the number of boxes containing items for delivery.

Moreover, communication unit 101 sends receipt information 503 to notification system 400 via a communication network. As shown in FIG. 4C, receipt information 503 includes receipt ID for identifying receipt of order, order ID for identifying an order, user ID for identifying an orderer, item ID for identifying an item in the order, and the quantity of the item in the order. It is to be noted that receipt information 503 shown in FIG. 4C is one example, and any other information is also possible. For example, receipt information 503 may further include the name of the item in the order.

Order receiver 102 is implemented by, for example, a processor and a memory storing instructions. It is to be noted that order receiver 102 may be implemented by a dedicated electronic circuit. Order receiver 102 performs an order receipt process based on order information 501 received from order device 300, and generates delivery request information 502, receipt information 503, and accepted item information.

The accepted item information is information on an item in the order, and is sent to package delivery instruction unit 103. The accepted item information includes, for example, the item ID and the quantity in order information 501.

Package delivery instruction unit 103 is implemented by, for example, a processor and a memory storing instructions. It is to be noted that package delivery instruction unit 103 may be implemented by a dedicated electronic circuit. Package delivery instruction unit 103 generates packaging instruction information based on the accepted item information received from order receiver 102. The packaging instruction information is information for a worker in a merchandise warehouse to prepare the shipping of the item, and is sent to display 104. The packaging instruction information includes, for example, the item ID, the quantity, and receipt ID.

Display 104 is implemented by, for example, a liquid-crystal display and/or an organic EL display. Display 104 is disposed in the merchandise warehouse, and displays the packaging instruction information. In the warehouse, the worker packs the item based on the packaging instruction information displayed on display 104, and hands over the item packed in a box with the receipt ID recognizable to a delivery company.

[Functional Configuration of Delivery Company Server 200]

Next, the functional configuration of delivery company server 200 will be described with reference to FIG. 2 and FIG. 4D. Delivery company server 200 is one example of the outside sever. As shown in FIG. 2, delivery company server 200 includes communication unit 201, deliverer's face information storage 202, delivery information receiver 203, and delivery assignment determination unit 204.

Communication unit 201 is implemented by, for example, a wired and/or wireless communication circuit. Communication unit 201 receives delivery request information 502 from e-commerce merchant server 100 via a communication network. Furthermore, communication unit 201 sends delivery details information 504 to notification system 400 via a communication network.

As shown in FIG. 4D, delivery details information 504 includes receipt ID for identifying receipt of order, delivery company ID for identifying a delivery company, expected delivery date and time, and deliverer's face information indicating the face of a deliverer who makes the delivery. It is to be noted that delivery details information 504 shown in FIG. 4D is one example, and any other information is also possible. The deliverer's face information may indicate the faces of deliverers.

Deliverer's face information storage 202 is implemented by, for example, a hard disk drive and/or a semiconductor memory. Deliverer's face information storage 202 stores face information of deliverers. The deliverer's face information may be a face image of a deliverer or a feature amount extracted from the face image.

Delivery information receiver 203 is implemented by, for example, a processor and a memory storing instructions. It is to be noted that delivery information receiver 203 may be implemented by a dedicated electronic circuit. Delivery information receiver 203 generates delivery instruction information based on delivery request information 502 received from e-commerce merchant server 100. The delivery instruction information includes information for assigning a deliverer to the delivery request, and is sent to delivery assignment determination unit 204.

Furthermore, delivery information receiver 203 generates delivery details information 504 based on the receipt ID and the deliverer's face information received from delivery assignment determination unit 204.

Delivery assignment determination unit 204 is implemented by, for example, a processor and a memory storing instructions. It is to be noted that delivery assignment determination unit 204 may be implemented by a dedicated electronic circuit. Delivery assignment determination unit 204 assigns a deliverer to the delivery request based on the delivery instruction information received from delivery information receiver 203, and retrieves the face information of the assigned deliverer from deliverer's face information storage 202. Delivery assignment determination unit 204 sends the retrieved deliverer's face information to delivery information receiver 203 together with the receipt ID. It is to be noted that an operator may assign a deliverer. In this case, delivery assignment determination unit 204 may present, to the operator, information for assigning a deliverer.

[Functional Configuration of Order Device 300]

Next, the functional configuration of order device 300 will be described with reference to FIG. 2. As shown in FIG. 2, order device 300 includes communication unit 301, input receiver 302, display 303, and controller 304.

Communication unit 301 is implemented by, for example, a wired and/or wireless communication circuit. Communication unit 301 sends order information 501 to e-commerce merchant server 100 via a communication network. Communication unit 301 may also send order information 501 to notification system 400.

Input receiver 302 is an input device for receiving an input from user 20. Input receiver 302 is implemented by, for example, a touch panel (i.e., a touch screen) integrated with a display. Input receiver 302 may also be implemented by, for example, a keyboard and/or a computer mouse. Input receiver 302 receives an input of information on an order from user 20.

Display 303 is implemented by, for example, a liquid-crystal display and/or an organic EL display. Display 303 displays a screen including information necessary to the order, based on information received by input receiver 302.

Controller 304 is implemented by, for example, a processor and a memory storing instructions. It is to be noted that controller 304 may be implemented by a dedicated electronic circuit. Controller 304 controls the operations of communication unit 301, input receiver 302, and display 303 to perform the order process.

[Configuration of Notification System 400]

Next, the configuration of notification system 400 will be described with reference to FIG. 2, FIG. 3, and FIG. 4E. As shown in FIG. 3, notification system 400 includes notification device 410 and intercom device 420. As shown in FIG. 2, notification system 400 also functionally includes communication unit 401, visit receiver 402, camera unit 403, delivery details information receiver 404, face image checker 405, and notification unit 406. Each of the functional components of notification system 400 is implemented in notification device 410 and/or intercom device 420.

Communication unit 401 is implemented in both notification device 410 and intercom device 420, and is also implemented by, for example, a wired and/or wireless communication circuit. Communication unit 401 receives receipt information 503 from e-commerce merchant server 100 via a communication network. Communication unit 401 also receives delivery details information 504 from delivery company server 200 via a communication network.

Moreover, communication unit 401 performs data communication between notification device 410 and intercom device 420. For example, communication unit 401 sends a camera image from intercom device 420 to notification device 410. A wired communication and/or a wireless communication can be used as the data communication. Wireless LAN, Bluetooth (registered trademark), Zigbee (registered trademark), or any combination thereof can be used as the wireless communication.

Visit receiver 402 is implemented in intercom device 420, and is also implemented by, for example, a call button. Visit receiver 402 receives visit of visitor 50 to building 10. Visit receiver 402 may operate in cooperation with camera unit 403.

Camera unit 403 is implemented in intercom device 420, and is also implemented by, for example, an image sensor and an optical lense. Camera unit 403 takes a picture of the outside of building 10 to capture a face image of visitor 50 received by visit receiver 402. An image captured by camera unit 403 is referred to as the camera image. Camera unit 403 may operate in cooperation with visit receiver 402.

Delivery details information receiver 404 is implemented in notification device 410, and is also implemented by, for example, a processor and a memory storing instructions. It is to be noted that delivery details information receiver 404 may be implemented by a dedicated electronic circuit. Delivery details information receiver 404 records, as delivery status information 505, delivery details information 504 received from delivery company server 200 and receipt information 503 received from e-commerce merchant server 100 in association with each other.

As shown in FIG. 4E, delivery status information 505 includes receipt ID for identifying receipt of order, order ID for identifying an order, user ID for identifying an orderer, item ID for identifying an item in the order, the quantity of the item in the order, delivery company ID for identifying a delivery company, expected delivery date and time, deliverer's face information indicating the face of a deliverer who make the delivery, and status indicating whether the deliverer has already arrived or not. It is to be noted that delivery status information 505 shown in FIG. 4E is one example, and any other information is also possible.

Furthermore, when the face image is captured by camera unit 403 in the receiving of the visit by visit receiver 402, delivery details information receiver 404 sends, to face image checker 405, the deliverer's face information with the status indicating "not yet arrived" in delivery status information 505. Delivery details information receiver 404 then sends an appropriate receipt ID to notification device 410, and updates the status of the appropriate receipt ID to "already arrived", based on the checking result of face image checker 405.

Face image checker 405 is implemented in notification device 410, and is also implemented by, for example, a processor and a memory storing instructions. It is to be noted that face image checker 405 may be implemented by a dedicated electronic circuit. Face image checker 405 checks the face image captured by camera unit 403 (i.e., the camera image) against the deliverer's face information received from delivery details information receiver 404. In other words, face image checker 405 compares the face information and the camera image to verify whether visitor 50 is the deliverer or not. Face image checker 405 sends the checking result to delivery details information receiver 404.

Notification unit 406 is implemented by, for example, a display, a speaker, a microphone, a user interface (e.g., a touch panel), or any combination of displays, speakers, microphones, or user interfaces. When visitor 50 is verified to be the deliverer, notification unit 406 notifies the user of delivery information indicating that the deliverer of the article has arrived at building 10. In the present embodiment, notification unit 406 displays the delivery information on a display (e.g., the liquid-crystal display and/or the organic EL display). It is to be noted that notification means of notification unit 406 is not limited to the display. Notification unit 406 may notify the user of the delivery information through, for example, sound and/or vibration. Notification unit 406 may also notify the user of the delivery information using any combination of sound and/or vibration, and display.

[Operation of Entire System Including Notification System 400]

The operation of the entire system including the notification system configured as described above will be described.

[Interaction Between Devices]

Firstly, interaction between e-commerce merchant server 100, delivery company server 200, order device 300, and notification system 400 will be described with reference to FIG. 5. FIG. 5 is a sequence diagram of the entire system including notification system 400 according to Embodiment 1. In FIG. 5, the number in parentheses denotes the chronological order.

First, order device 300 performs the order process (01). With this, order information 501 is sent from order device 300 to e-commerce merchant server 100 (02).

Subsequently, based on order information 501, e-commerce merchant server 100 sends delivery request information 502 to delivery company server 200 (03-1), and receipt information 503 to notification system 400 (03-2). Furthermore, e-commerce merchant server 100 displays the packaging instruction information (04).

Delivery company server 200 assigns a deliverer to a delivery request based on delivery request information 502 (05). Furthermore, delivery company server 200 obtains the face information of the assigned deliverer (06), and sends, to notification system 400, delivery details information 504 including the obtained face information (07).

Here, when notification system 400 receives visitor 50 (08), notification system 400 captures the face image of visitor 50 (09). Notification system 400 then extracts, from delivery status information 505, the deliverer's face information with the status indicating "not yet arrived" (10). Notification system 400 checks the captured face image of visitor 50 against the extracted deliverer's face information (11). Notification system 400 switches the screen content based on the checking result (12).

[Processing of Order Device 300]

Figure 6:
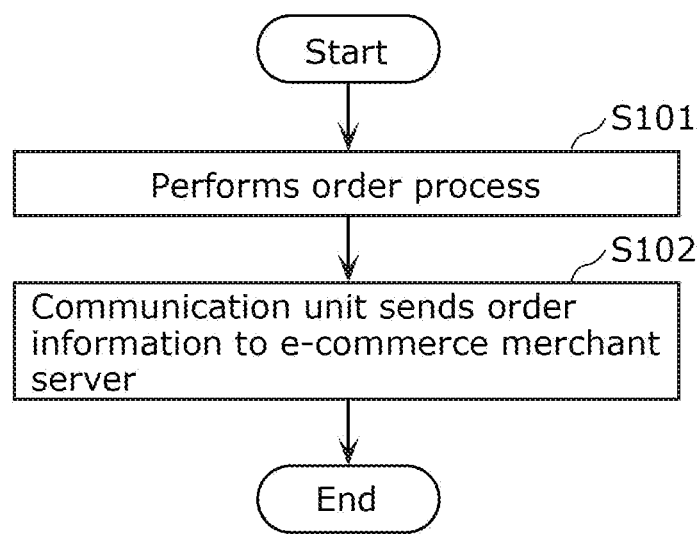
FIG. 6 is a flow chart illustrating the processing of an order device according to Embodiment 1.

Next, the processing of order device 300 will be described with reference to FIG. 6. FIG. 6 is a flow chart illustrating the processing of order device 300 according to Embodiment 1.

First, controller 304 performs the order process (S101). More specifically, controller 304 generates order information 501 based on an input of user 20 received by input receiver 302. Communication unit 301 sends order information 501 to e-commerce merchant server 100 (S102).

[Processing of E-Commerce Merchant Server 100]

Figure 7:
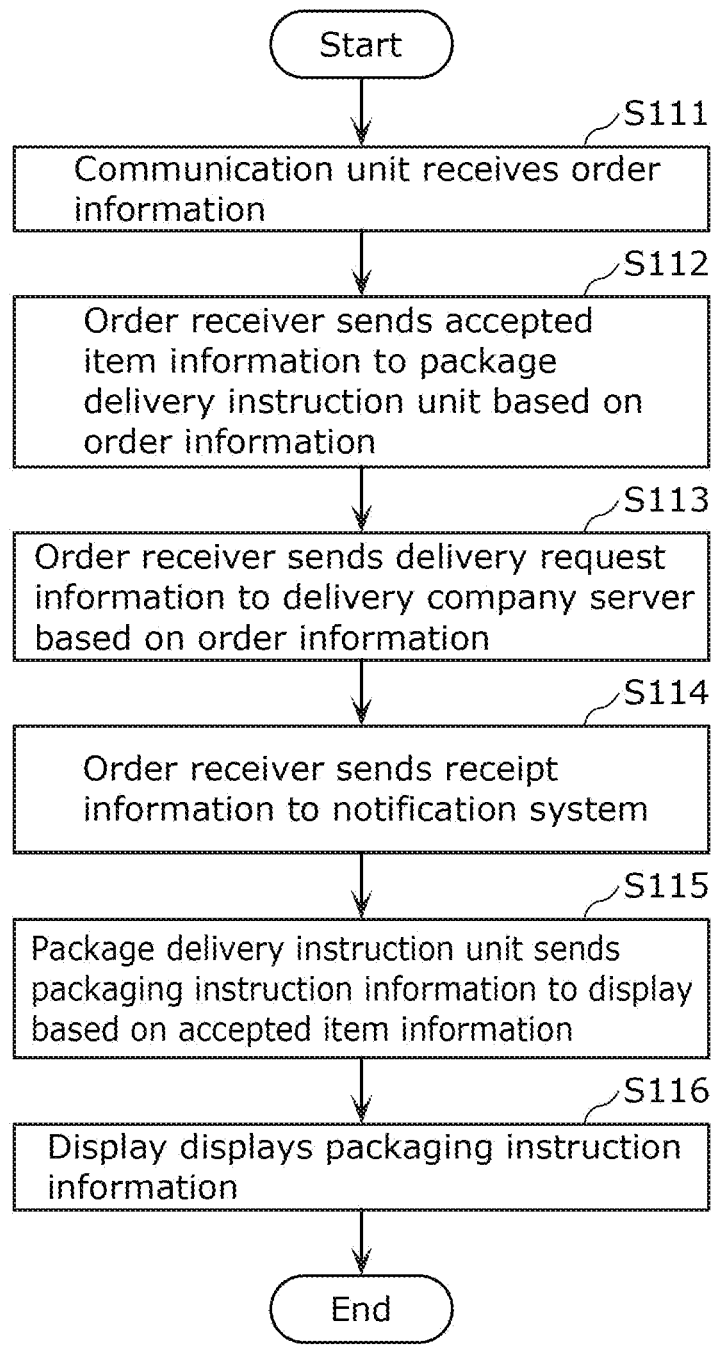
FIG. 7 is a flow chart illustrating the processing of an e-commerce merchant server according to Embodiment 1.

Next, the processing of e-commerce merchant server 100 will be described with reference to FIG. 7. FIG. 7 is a flow chart illustrating the processing of e-commerce merchant server 100 according to Embodiment 1.

Communication unit 101 receives order information 501 from order device 300 (S111). Order receiver 102 sends the accepted item information to package delivery instruction unit 103 based on order information 501 (S112).

Order receiver 102 sends delivery request information 502 to delivery company server 200 via communication unit 101 based on order information 501 (S113). Order receiver 102 sends receipt information 503 to notification system 400 via communication unit 101 based on order information 501 (S114).

Package delivery instruction unit 103 sends the packaging instruction information to display 104 based on the accepted item information (S115). Display 104 displays the packaging instruction information (S116).

[Processing of Delivery Company Server 200]

Figure 8:
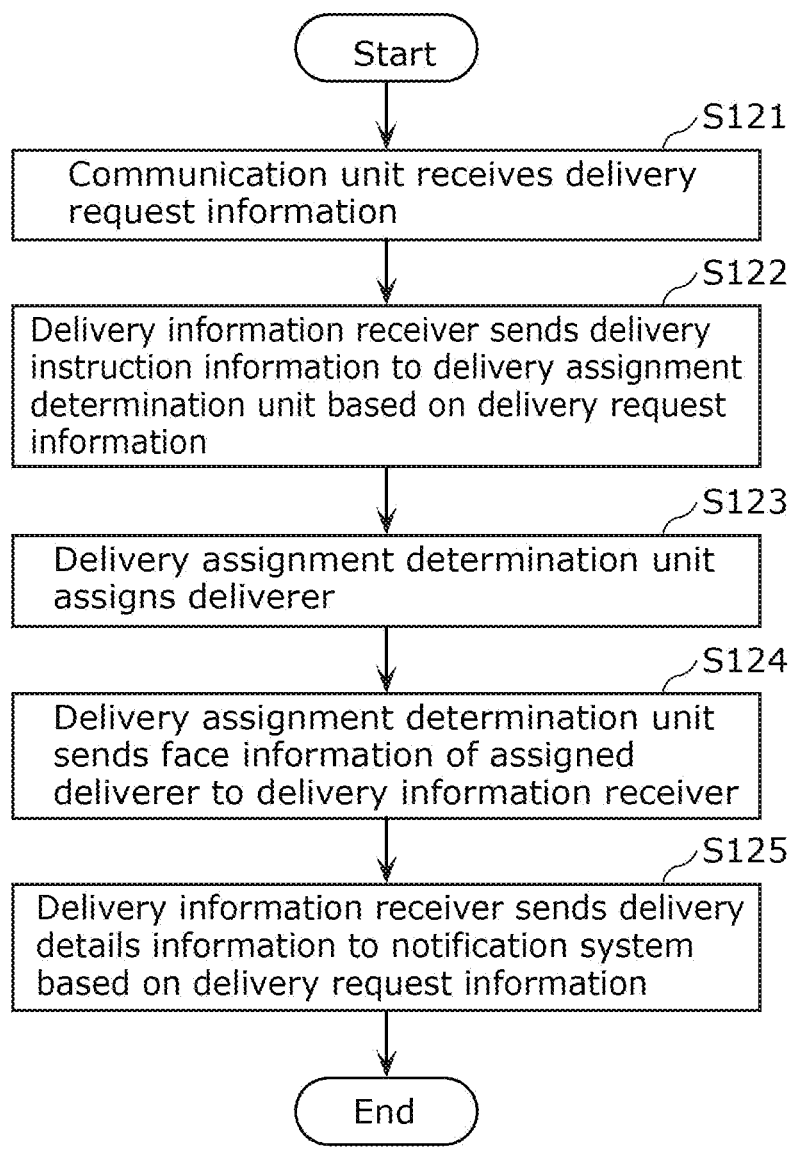
FIG. 8 is a flow chart illustrating the processing of a delivery company server according to Embodiment 1.

Next, the processing of delivery company server 200 will be described with reference to FIG. 8. FIG. 8 is a flow chart illustrating the processing of delivery company server 200 according to Embodiment 1.

Communication unit 201 receives delivery request information 502 from e-commerce merchant server 100 (S121). Delivery information receiver 203 sends the delivery instruction information to delivery assignment determination unit 204 based on delivery request information 502 (S122). Delivery assignment determination unit 204 assigns a deliverer to a delivery request (S123). Delivery assignment determination unit 204 sends the face information of the assigned deliverer to delivery information receiver 203 (S124). Delivery information receiver 203 sends delivery details information 504 to notification system 400 based on delivery request information 502 (S125).

[Processing of Notification System 400]

Figure 9:
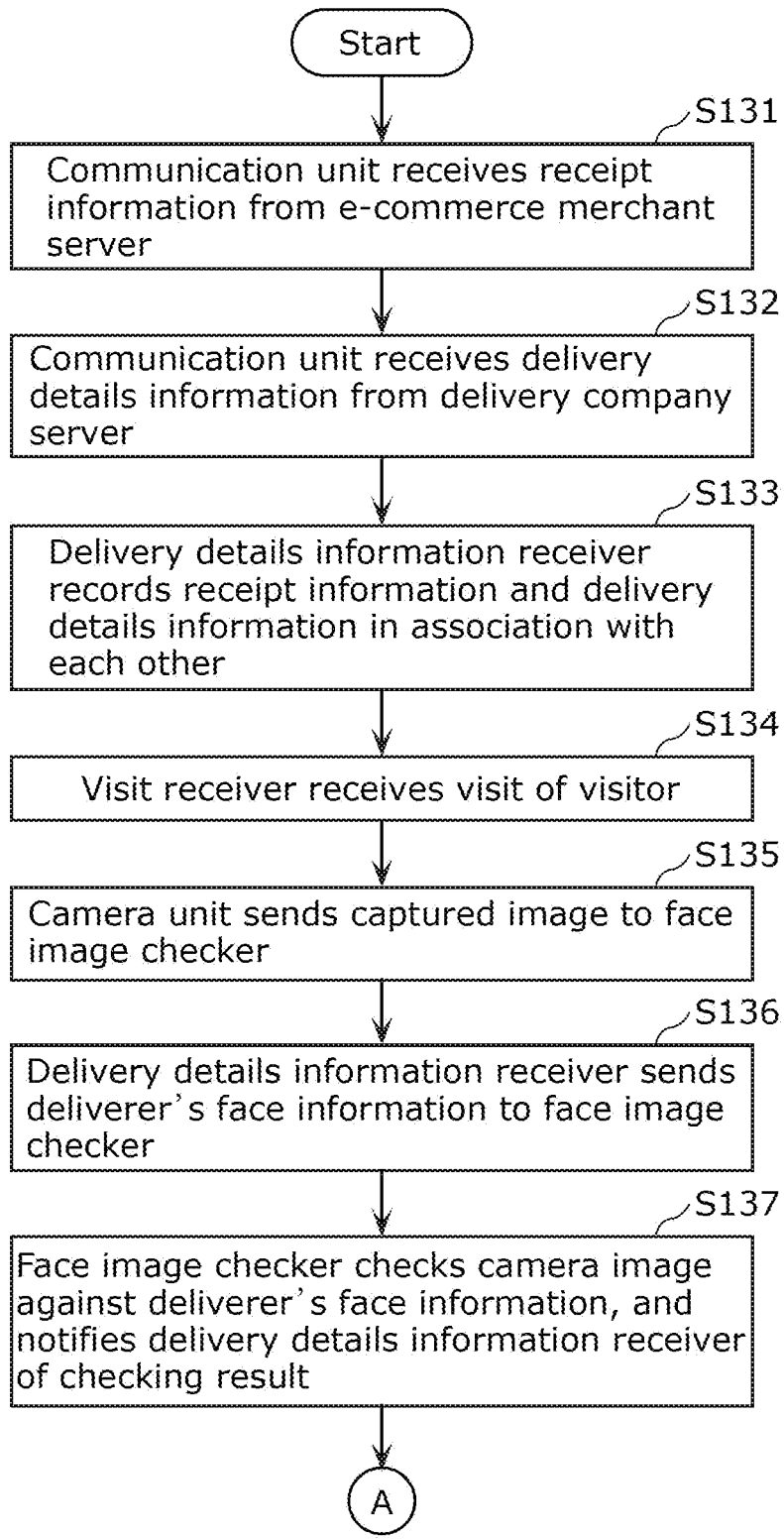
FIG. 9 is a flow chart illustrating the processing of the notification system according to Embodiment 1.
Figure 10:
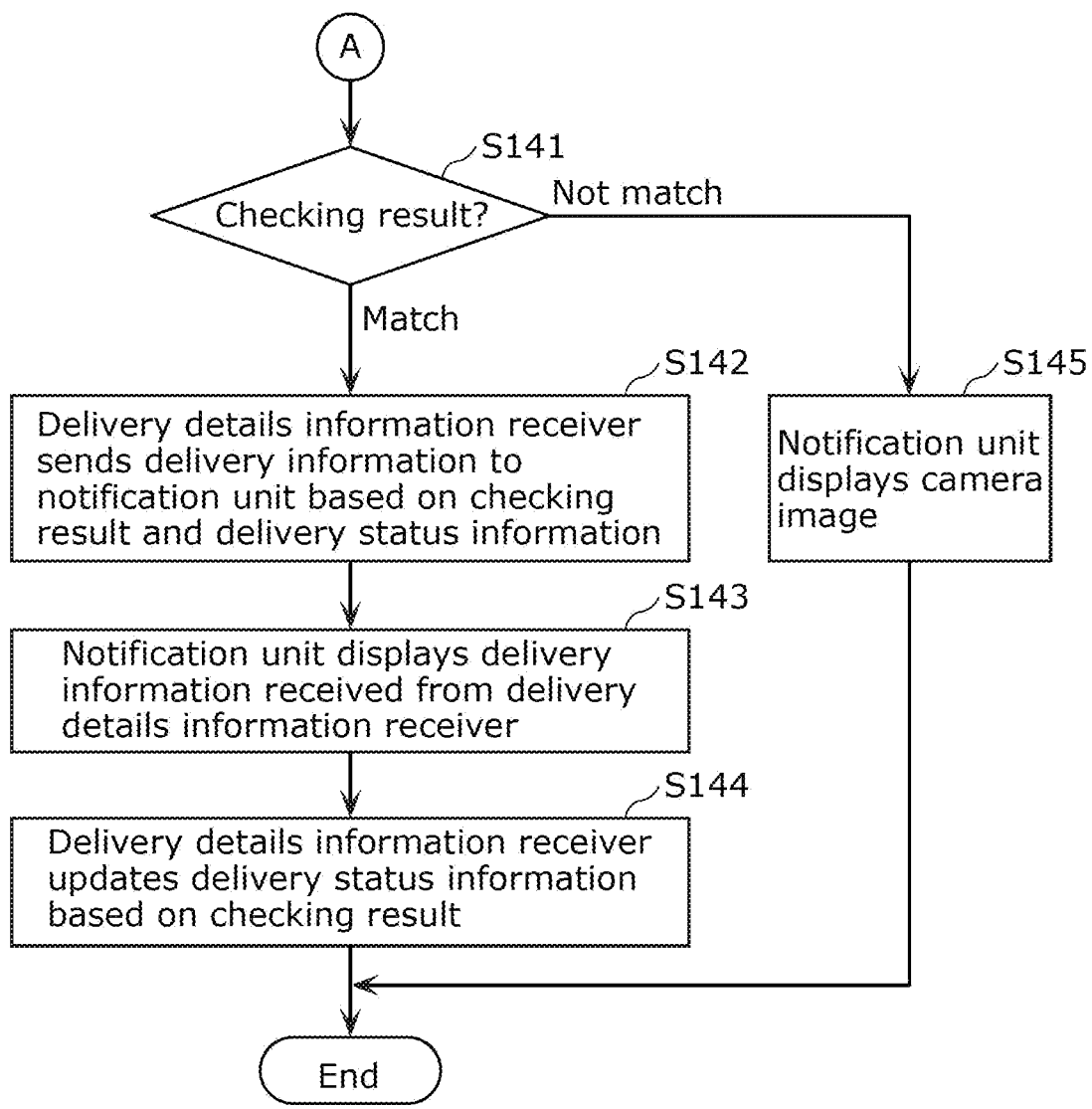
FIG. 10 is a flow chart illustrating the processing of the notification system according to Embodiment 1.

Next, the processing of notification system 400 will be described with reference to FIG. 9 and FIG. 10. FIG. 9 and FIG. 10 are a flow chart illustrating the processing of notification system 400 according to Embodiment 1.

First, communication unit 401 receives receipt information 503 from e-commerce merchant server 100 (S131). Communication unit 401 also receives delivery details information 504 from delivery company server 200 (S132). Delivery details information receiver 404 records, as delivery status information 505, receipt information 503 and delivery details information 504 in association with each other (S133).

Visit receiver 402 receives the visit of visitor 50 (S134). In doing so, camera unit 403 captures the face image of visitor 50, and sends the captured face image to face image checker 405 (S135). Delivery details information receiver 404 sends the deliverer's face information to face image checker 405 (S136). Face image checker 405 checks the face image of visitor 50 captured by camera unit 403 against the deliverer's face information, and notifies delivery details information receiver 404 of the checking result (S137). With this, visitor 50 is verified whether to be the deliverer or not.

Here, when the face image of visitor 50 matches any piece of the deliverer's face information (match at S141), delivery details information receiver 404 sends, to notification device 410, the delivery information indicating which deliverer related to which order has been arrived, based on the checking result and delivery status information 505 (S142).

Notification unit 406 displays the delivery information received from delivery details information receiver 404 (S143). In doing so, notification unit 406 may display the delivery information using the first notification method. For example, notification unit 406 may display the delivery information after outputting the first notification sound, or display the delivery information in the first color.

Delivery details information receiver 404 updates delivery status information 505 based on the checking result (S144). More specifically, delivery details information receiver 404 changes the status associated with the matched piece of the deliverer's face information, to "already arrived".

On the other hand, the face image of visitor 50 does not match any piece of the deliverer's face information (not match at S141), notification unit 406 displays the image captured by camera unit 403 (S145). In other words, notification unit 406 notifies the user of visit information indicating the arrival of visitor 50 to building 10. In doing so, notification unit 406 may display the visit information using the second notification method. The second notification method is different from the first notification method at step S143. For example, notification unit 406 may display the visit information after outputting the second notification sound different from the first notification sound, or display the visit information in the second color different from the first color.

[Display Example of Delivery Information]

Figure 11A:
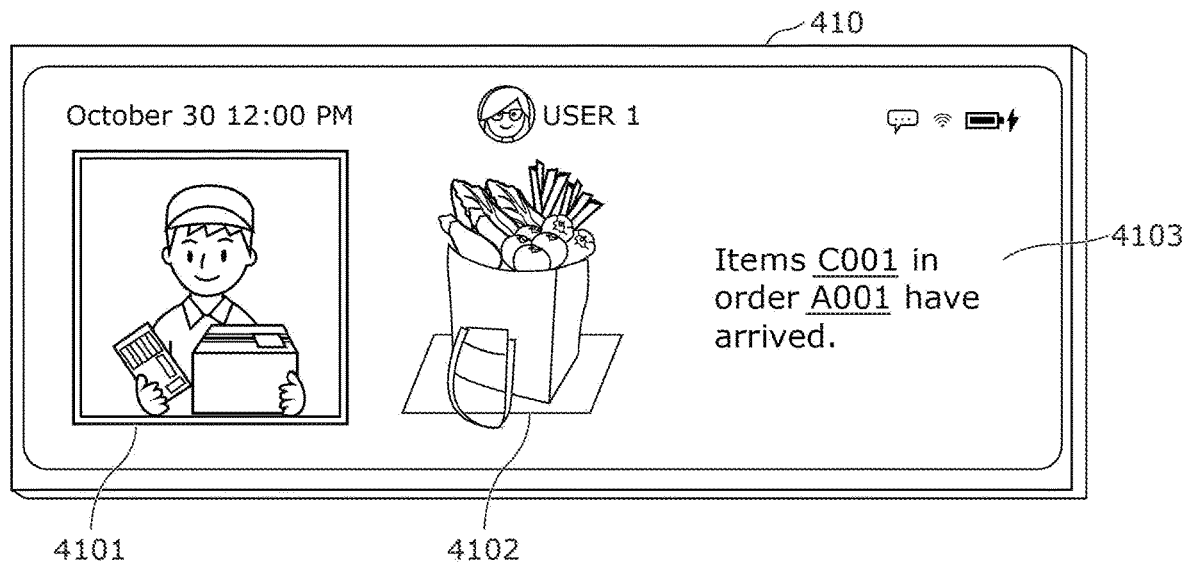
FIG. 11A illustrates one example of a screen including delivery information according to Embodiment 1.
Figure 11B:
FIG. 11B illustrates one example of a screen excluding the delivery information according to Embodiment 1.

Here, one example of a display screen at each of steps S143 and S145 of FIG. 10 will be described with reference to FIG. 11A and FIG. 11B. FIG. 11A illustrates one example of the screen including the delivery information according to Embodiment 1. FIG. 11B illustrates one example of the screen excluding the delivery information according to Embodiment 1.

In FIG. 11A, image 4101 of the visitor (deliverer) captured by camera unit 403, image 4102 of the delivered articles, and delivery information 4103 are displayed on the display of notification device 410. Here, delivery information 4103 includes information for user 20 to know the order and the items in the order as well as information indicating that the deliverer has been arrived. It is to be noted that delivery information 4103 is one example, and any other information is also possible. For example, delivery information 4103 may further include information on the merchant, date and time of order, item names corresponding to the respective articles, or any combination thereof.

Image 4102 of the delivered articles may be obtained from order device 300 based on the order ID, or from e-commerce merchant server 100 based on the order receipt ID.

In FIG. 11B, image 4101 of the visitor captured by camera unit 403 and visit information 4104 indicating that the visitor is a person whose face image does not match the deliverer's face information are displayed on the display of notification device 410.

[Advantageous Effects, Etc.]

As described above, a control method for notification system 400 according to the present embodiment may include: (a) obtaining face information of a deliverer of an article from outside server 200; (b) obtaining a camera image of a face of visitor 50 to building 10, the camera image being captured by a camera disposed outside building 10; (c) verifying whether visitor 50 is the deliverer by comparing the face information and the camera image; and (d) when visitor 50 is verified to be the deliverer, notifying, by notification device 410, a user of delivery information indicating that the deliverer of the article has arrived at building 10.

With this, it is possible to verify whether visitor 50 is a deliverer or not by comparing the face information of the deliverer and the face image of visitor 50. Moreover, when visitor 50 is verified to be the deliverer, it is possible to notify the user of the delivery information. Accordingly, when visitor 50 pretends a deliverer, the user can verify that visitor 50 is not a deliverer, and thus it is possible to improve the security. Furthermore, the comparison is performed in notification system 400, and thus the camera image need not be sent to the delivery company. Accordingly, it is also possible to protect the privacy of visitor 50.

Moreover, the control method for notification system 400 according to the present embodiment may further include (g) when visitor 50 is not verified to be the deliverer, notifying, by notification device 410, the user of visit information indicating arrival of visitor 50 to building 10, using a second notification method, and in (d), the user may be notified of the delivery information using a first notification method different from the second notification method.

With this, a different notification method can be used between when visitor 50 is a deliverer and visitor 50 is not a deliverer, and thus it is possible to easily cause user 20 to know whether visitor 50 is a deliverer. Accordingly, it is possible to improve the security.

Variation of Embodiment 1

Next, a variation of Embodiment 1 will be described. The present variation differs mainly in the functional arrangement of the notification system from Embodiment 1 described above. More specifically, the present variation differs from Embodiment 1 mainly in that a part of the function of the notification device is implemented by a cloud server. The present variation will be described below with reference to the accompanying Drawings mainly in terms of differences from Embodiment 1.

[Functional Arrangement of Notification System 400A]

Figure 12:
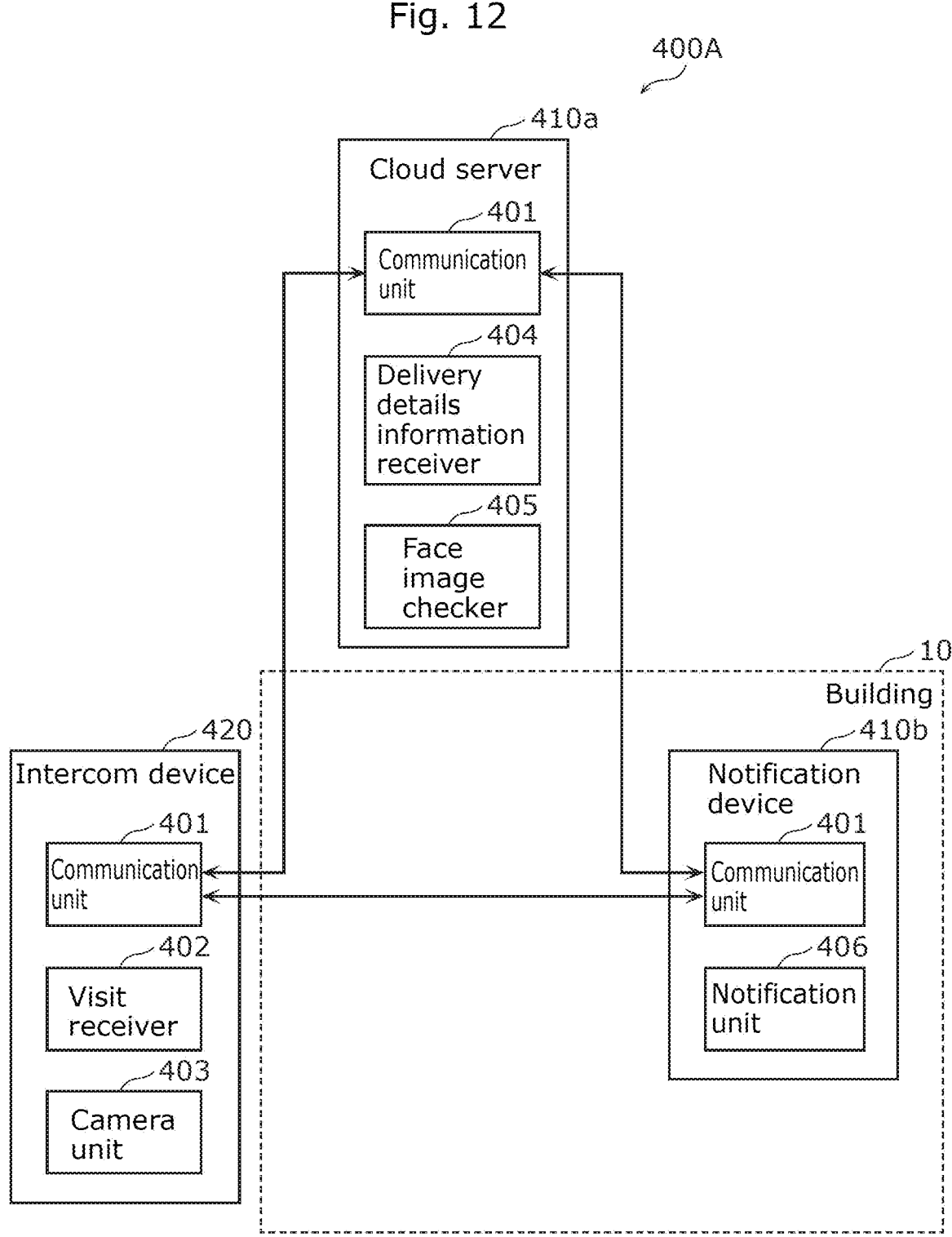
FIG. 12 is a block diagram illustrating the functional arrangement of a notification system according to a variation of Embodiment 1.
Figure 13:
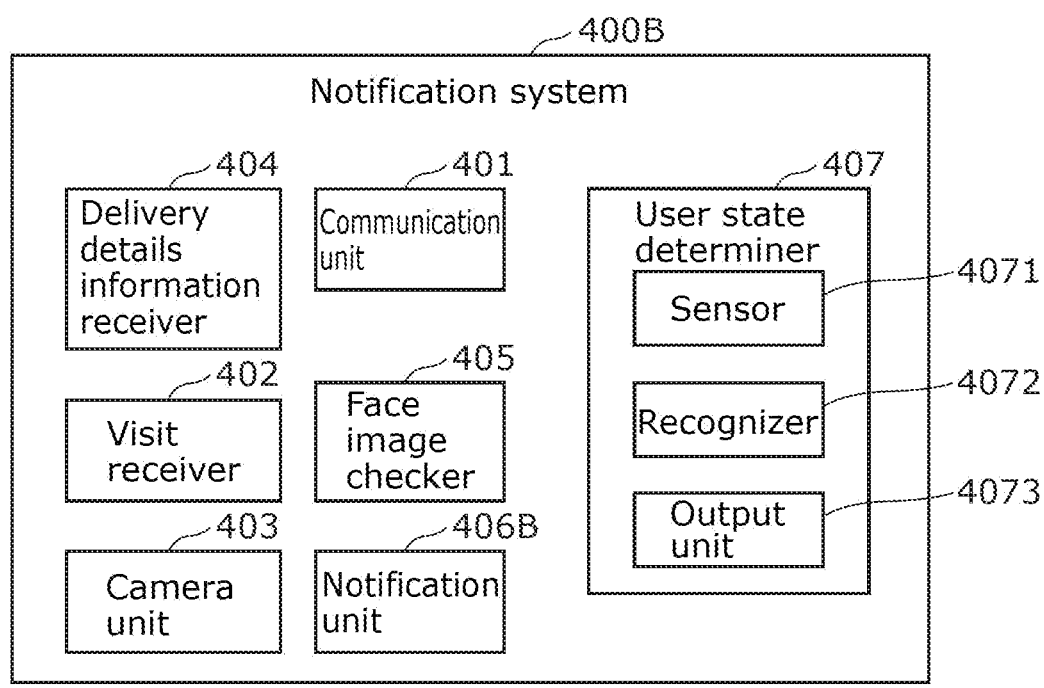
FIG. 13 is a block diagram illustrating the functional configuration of a notification system according to Embodiment 2.

FIG. 12 is a block diagram illustrating the functional arrangement of notification system 400A according to a variation of Embodiment 1. Notification system 400A includes cloud server 410a, notification device 410b, and intercom device 420.

Cloud server 410a is located outside building 10, and is communicably connected to notification device 410b and intercom device 420. In cloud server 410a, the processing is performed using cloud computing environments. It is to be noted that instead of cloud server 410a, an edge server in which the processing is performed using edge computing may be used.

As shown in FIG. 12, cloud server 410a includes communication unit 401, delivery details information receiver 404, and face image checker 405.

Notification device 410b is located inside building 10, and is communicably connected to cloud server 410a and intercom device 420. For example, notification device 410b is fixed to a wall, a floor, or a ceiling of building 10. It is to be noted that notification device 410b may be portable. As shown in FIG. 12, notification device 410b includes communication unit 401 and notification unit 406.

[Advantageous Effects, Etc.]

As described above, in notification system 400A according to the present variation, cloud server 410a may be provided with face image checker 405 which checks the camera image against the face information.

With this, the checking of the camera image against the face information can be implemented in cloud server 410a, and thus it is possible to reduce the processing load of notification device 410b. Accordingly, notification system 400A can be introduced even when the capacity of notification device 410b is low, and thus it is possible to improve the versatility of notification system 400A.

Embodiment 2

Next, Embodiment 2 will be described. Embodiment 2 differs from Embodiment 1 described above mainly in that the notification method can be switched according to the user's action. The present embodiment will be described below with reference to the accompanying Drawings mainly in terms of differences from Embodiment 1.

[Functional Configuration of Notification System 400B]

Notification system 400B according to the present embodiment includes communication unit 401, visit receiver 402, camera unit 403, delivery details information receiver 404, face image checker 405, notification unit 406B, and user state determiner 407. User state determiner 407 includes sensor 4071, recognizer 4072, and output unit 4073.

Sensor 4071 is implemented by, for example, sensors displaced inside building 10. For example, an image sensor, an infrared sensor, a visible-light sensor, or a microphone can be used as the sensor. Sensor 4071 senses user 20.

Recognizer 4072 is implemented by, for example, a processor and a memory storing instructions. It is to be noted that recognizer 4072 may be implemented by a dedicated electronic circuit. Recognizer 4072 identifies the action of user 20 based on the output signal of sensor 4071. The output signal of sensor 4071 is, for example, a time-sequence signal of sensor values or data obtained by processing the time-sequence signal.

For example, recognizer 4072 refers to reference information stored in the memory to determine the action of user 20 corresponding to the output signal of sensor 4071. Here, the reference information is information in which actions of users and patterns of the output signal are associated with each other. It is to be noted that the reference information may be information in which users, actions of users, and patterns of the output signal are associated with each other. In this case, recognizer 4072 can also identify a user from the output signal of sensor 4071. It is to be noted that as the method of identifying the action of the user using recognizer 4072, a conventional technique may be used, and any other technique is also possible.

Output unit 4073 outputs, to notification unit 406B, action information of user 20 identified by recognizer 4072.

Notification unit 406B determines whether user 20 is doing a predetermined action, based on the action information of user 20 obtained from user state determiner 407. Notification unit 406B switches the notification method for notifying the delivery information according to the determination result. More specifically, notification unit 406B notifies the user of the delivery information using the first notification method when user 20 is determined to be doing the predetermined action, and using the second notification method different from the first notification method when user 20 is determined not to be doing the predetermined action.

For example, in the first notification method, the first notification sound may be used, and in the second notification method, the second notification sound different from the first notification sound may be used. Moreover, for example, the screen transition may be different between the first notification method and the second notification method.

For example, an action making it difficult for user 20 to receive articles from the deliverer may be employed as the predetermined action. More specifically, cooking, cleaning a room, watching TV, taking a bath, being in a toilet, sleeping, or the like may be used as the predetermined action.

The predetermined action may be defined in more detail. The determination whether to be the predetermined action may be changed according to the details of the cooking. Predetermined cooking is determined to be the predetermined action, but non-predetermined cooking is determined not to be the predetermined action. For example, the action of cooking using a stove or an induction cooker is determined to be the predetermined action, but the action of cutting food on a cutting board is determined not to be the predetermined action. Alternatively, the determination whether to be the predetermined action may be changed according to the content of the TV program. For example, the action of watching a sport program is determined to be the predetermined action, but the action of watching an infotainment program is determined not to be the predetermined action.

With this, it is possible to define the predetermined action in detail among cooking actions or TV watching actions when the user is cooking or watching TV, and it is further possible not to define the predetermined action in detail when the user is taking a bath, being in a toilet, or sleeping.

[Processing of Notification System 400B]

Figure 14:
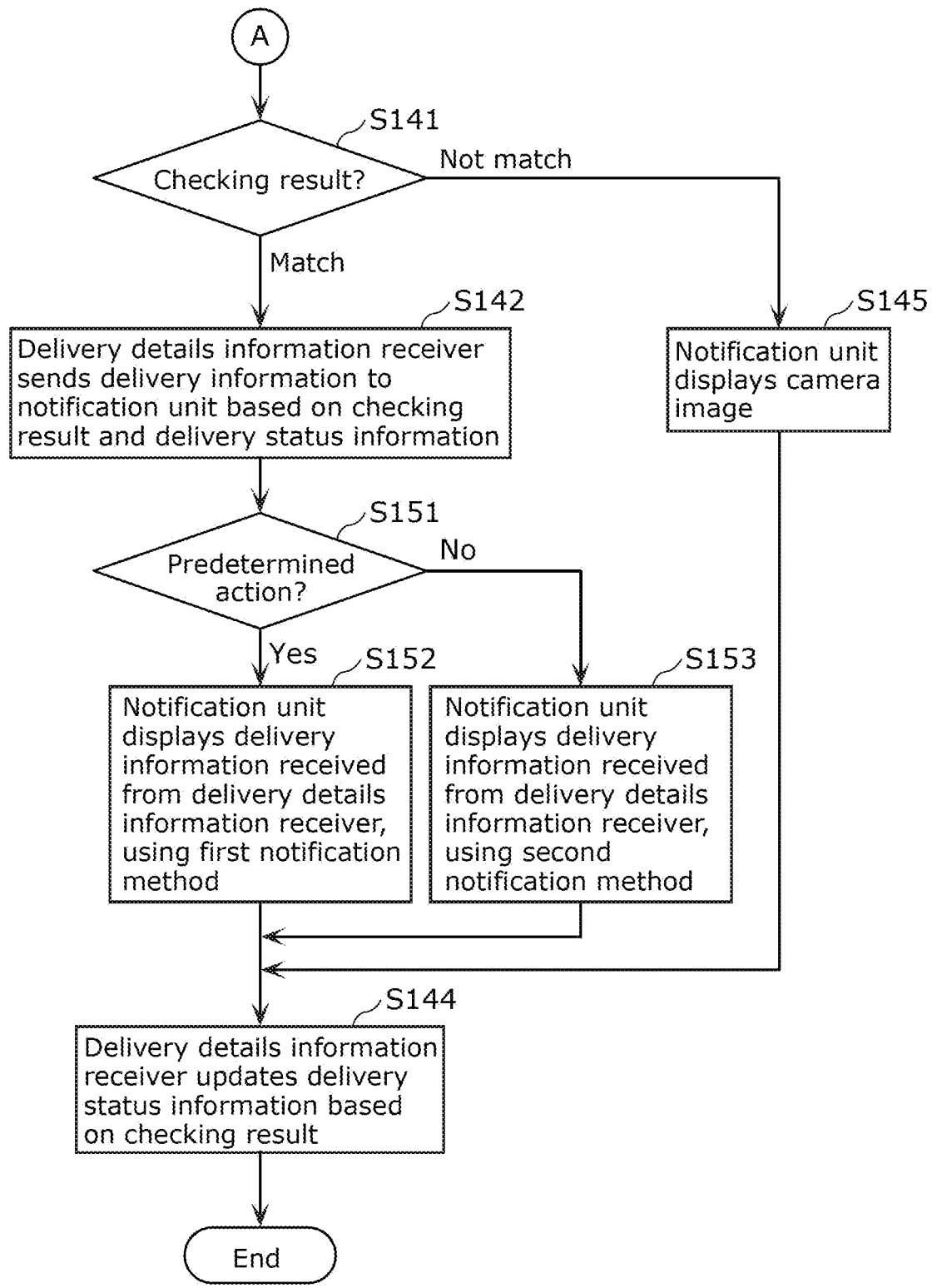
FIG. 14 is a flow chart illustrating the processing of the notification system according to Embodiment 2.

Next, the processing of notification system 400B will be described with reference to FIG. 14. FIG. 14 is a flow chart illustrating the processing of notification system 400B according to Embodiment 2.

After the processes at steps S131 through S142 are performed in the same manner as Embodiment 1, notification unit 406B determines whether user 20 is doing a predetermined action, based on the action information of user 20 obtained from user state determiner 407 (S151). Here, when user 20 is determined to be doing the predetermined action (Yes at S151), notification unit 406B displays the delivery information using the first notification method (S152). On the other hand, when user 20 is determined not to be doing the predetermined action (No at S151), notification unit 406B displays the delivery information using the second notification method (S153).

[Display Example of Delivery Information]

Figure 15:
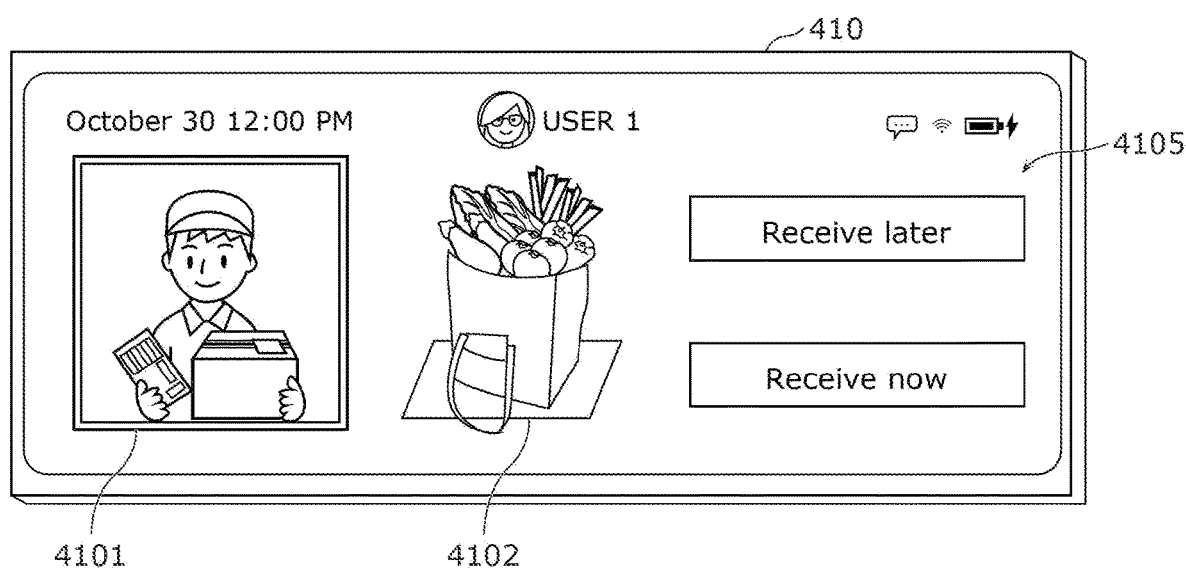
FIG. 15 illustrates one example of a display screen according to Embodiment 2.

Here, the first notification method for use in step S152 of FIG. 14 and the second notification method for use in step S153 of FIG. 14 will be described with reference to FIG. 11A and FIG. 15. FIG. 15 illustrates one example of a display screen according to Embodiment 2.

Firstly, the first notification method will be described. As shown in FIG. 15, in the first notification method, notification unit 406B displays, on the display, image 4101 of the visitor (deliverer) captured by camera unit 403, image 4102 of the delivered articles, and receipt selection button 4105. Receipt selection button 4105 is a graphical user interface through which the user can select whether to receive the articles from the deliverer later or now. Here, when "receive now" is selected, for example, delivery information 4103 in FIG. 11A is displayed. On the other hand, when "receive later" is selected, for example, a screen for designating redelivery date and time is displayed.

A message "receive in one minute" may be used as another example of receipt selection button 4105. In other words, this example corresponds to an option for notifying the deliverer that the user will receive the items in a predetermined time, and also corresponds to a request to the deliverer to wait for the predetermined time in front of building 10. For example, when "receive in one minute" is selected, textual information indicating that the user will receive the items in a predetermined time is displayed on the display screen of input receiver 302. It is to be noted that time count until the predetermined time has elapsed may be displayed on the screen. Moreover, a message "please leave items in front of the door because I will receive them later" may be employed as another example of receipt selection button 4105.

Next, the second notification method will be described. In the second notification method, receipt selection button 4105 in FIG. 15 is not displayed, and delivery information 4103 in FIG. 11A is displayed from the beginning.

It is to be noted that the screen transitions in the first notification method and the second notification method shown in FIG. 11A and FIG. 15 are one example, and any other screen transition is also possible.

Notification unit 406B switches the notification method for notifying the delivery information according to the result of determining whether user 20 is doing a predetermined action. In doing so, when the user is determined to be doing the predetermined action which makes it difficult for the user to receive articles from the deliverer, notification unit 406B automatically requests, through intercom device 420, the deliverer to redeliver the items a predetermined time later, and notifies user 20 using the second notification method when the request has been made. For example, intercom device 420 informs the deliverer of a request to redeliver the items a predetermined time later through the display or the speaker of input receiver 302. When the request to visitor 50 has been changed based on only the action of user 20, information on user 20 is revealed according to the details of the request. Accordingly, only visitor 50 who matches the deliverer's face information is requested to redeliver the items according to the state of user 20, and thus it is possible to make a redelivery request in view of security.

[Advantageous Effects, Etc.]

As described above, in the control method for notification system 400B according to the present embodiment, sensor 4071 for sensing user 20 is located inside building 10, the control method further includes (e) determining whether user 20 is doing a predetermined action, based on an output signal of sensor 4071, and in (d), a notification method for notifying the delivery information may be switched according to a result of the determining in (e).

With this, it is possible to switch the notification method for notifying the delivery information according to the action of user 20. For example, in a situation in which user 20 is doing an action making it difficult to receive articles from the deliverer, it is possible to notify user 20 of the delivery information using a notification method appropriate to the situation.

Variation of Embodiment 2

Next, a variation of Embodiment 2 will be described. The present variation differs from Embodiment 2 described above mainly in that a notification device that notifies a user of delivery information can be selected from among multiple notification devices according to the users' actions. The present variation will be described below with reference to the accompanying Drawings mainly in terms of differences from Embodiment 2.

In the present variation, multiple notification devices 410*b* are located inside building 10. Moreover, sensor 4071 is implemented by, for example, sensors disposed in different positions of building 10, and senses each of users 20 inside building 10.

Cloud server 410*a* selects, from among users 20, at least one user 20 who is not doing the predetermined action, based on the output signals of sensors 4071. Cloud server 410*a* sends the delivery information to at least one notification device 410*b* located within a predetermined range from selected user 20 among multiple notification devices 410*b*. At least one notification device 410*b* notifies the selected user of the delivery information received from cloud server 410*a*.

The predetermined range is defined by, for example, a predetermined distance. In this case, the predetermined distance may be stored in a memory. Moreover, the predetermined range may be defined by an area partitioned in advance (e.g., a kitchen, a child's room, etc.) in building 10.

[Display Example of Delivery Information]

Figure 16:
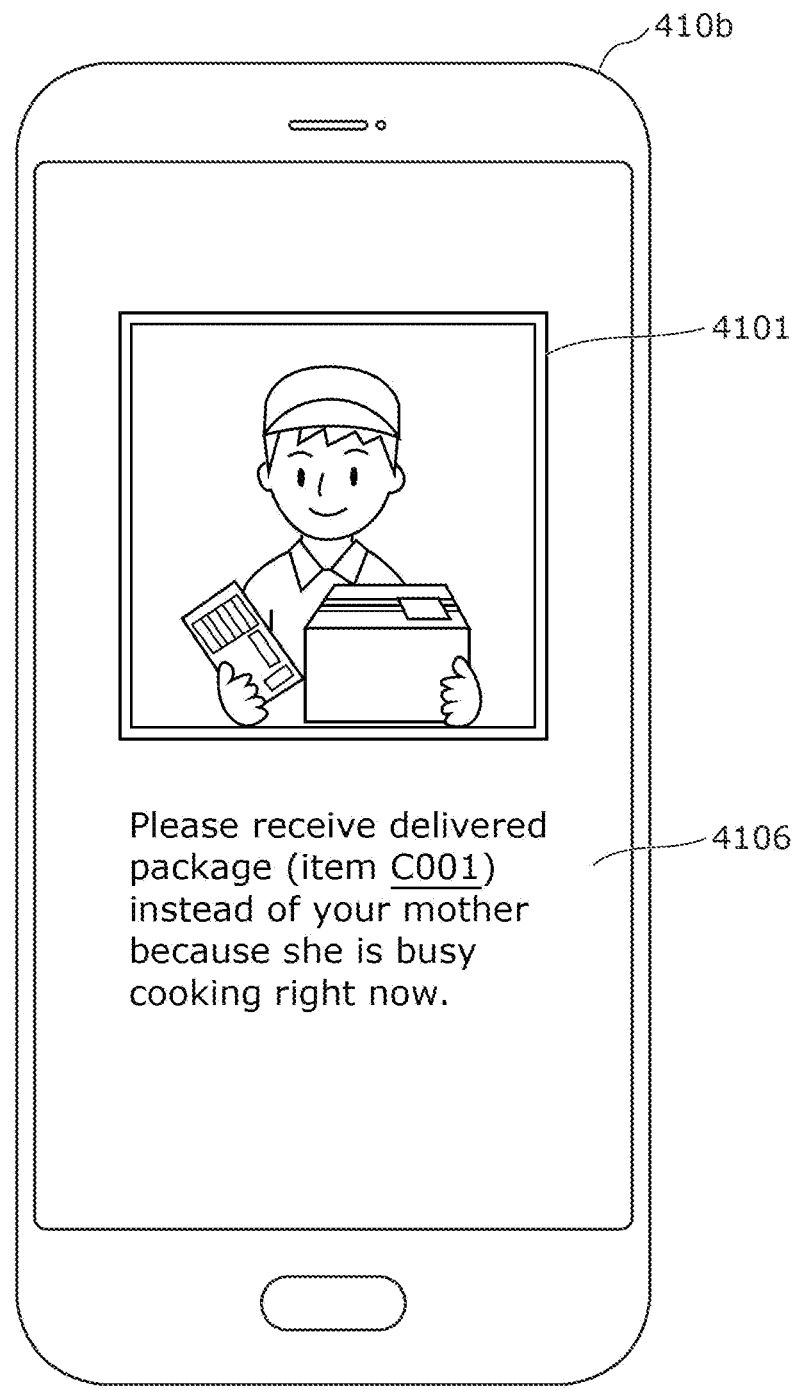
FIG. 16 illustrates one example of a screen including delivery information according to a variation of Embodiment 2.
Figure 17:
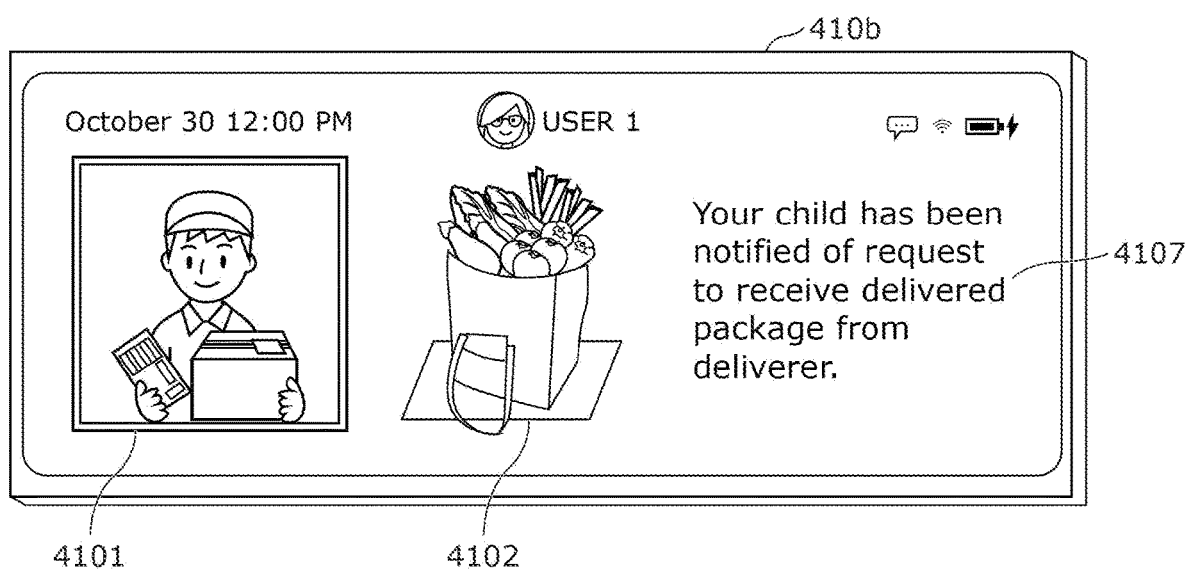
FIG. 17 illustrates one example of a screen excluding the delivery information according to the variation of Embodiment 2.

One example of a display screen according to the present variation will be described with reference to FIG. 16 and FIG. 17. FIG. 16 illustrates one example of the screen including the delivery information according to the variation of Embodiment 2. FIG. 17 illustrates one example of the screen excluding the delivery information according to the variation of Embodiment 2.

Here, inside building 10, a mother is cooking in the kitchen, and a child is reading a book in the child's room. In this case, when the face image of visitor 50 matches the deliverer's face information, the child who is not doing the predetermined action, e.g., cooking, is selected from among the mother and the child inside building 10. Notification device 410*b* located in the child's room then displays, as delivery information 4106, textual information "Please receive the delivered package (item C0001) instead of your mother because she is busy cooking right now." On the other hand, notification device 410*b* located in the kitchen displays textual information 4107 "Your child has been notified of a request to receive the delivered package from the deliverer."

With this, it is possible to ensure that the child receives the delivered package instead of his/her mother who cannot receive the delivered package because she is busy cooking.

[Advantageous Effects, Etc.]

As described above, in the control method for notification system 400*b* according to the present variation, notification system 400B includes a plurality of notification devices 410*b*, sensor 4071 senses each of a plurality of users 20, the control method further includes: (f) selecting at least one user 20 who is not doing the predetermined action from among users 20 based on the output signal of sensor 4071, and in (d), the at least one user selected may be notified of the delivery information by at least one of notification devices 410*b*. Here, at least one notification device 410*b* is located within the predetermined range from at least one selected user 20.

With this, it is possible to avoid user 20 who is doing the action making it difficult to receive articles from the deliverer and inform another user 20, who is not doing such an action, of the delivery information. Accordingly, it is possible to ensure that user 20 receives articles from the deliverer.

Embodiment 3

Next, Embodiment 3 will be described. Embodiment 3 differs from Embodiment 1 described above mainly in that the notification method for notifying the visit information is switched based on visit schedule information to the building of a visitor different from a deliverer of an article. The present embodiment will be described below with reference to the accompanying Drawings mainly in terms of differences from Embodiment 1.

It is to be noted that the configuration of notification system 400 according to the present embodiment is similar to that of Embodiment 1 described above, and thus its drawings and descriptions are omitted.

[Processing of Notification System 400]

Figure 18:
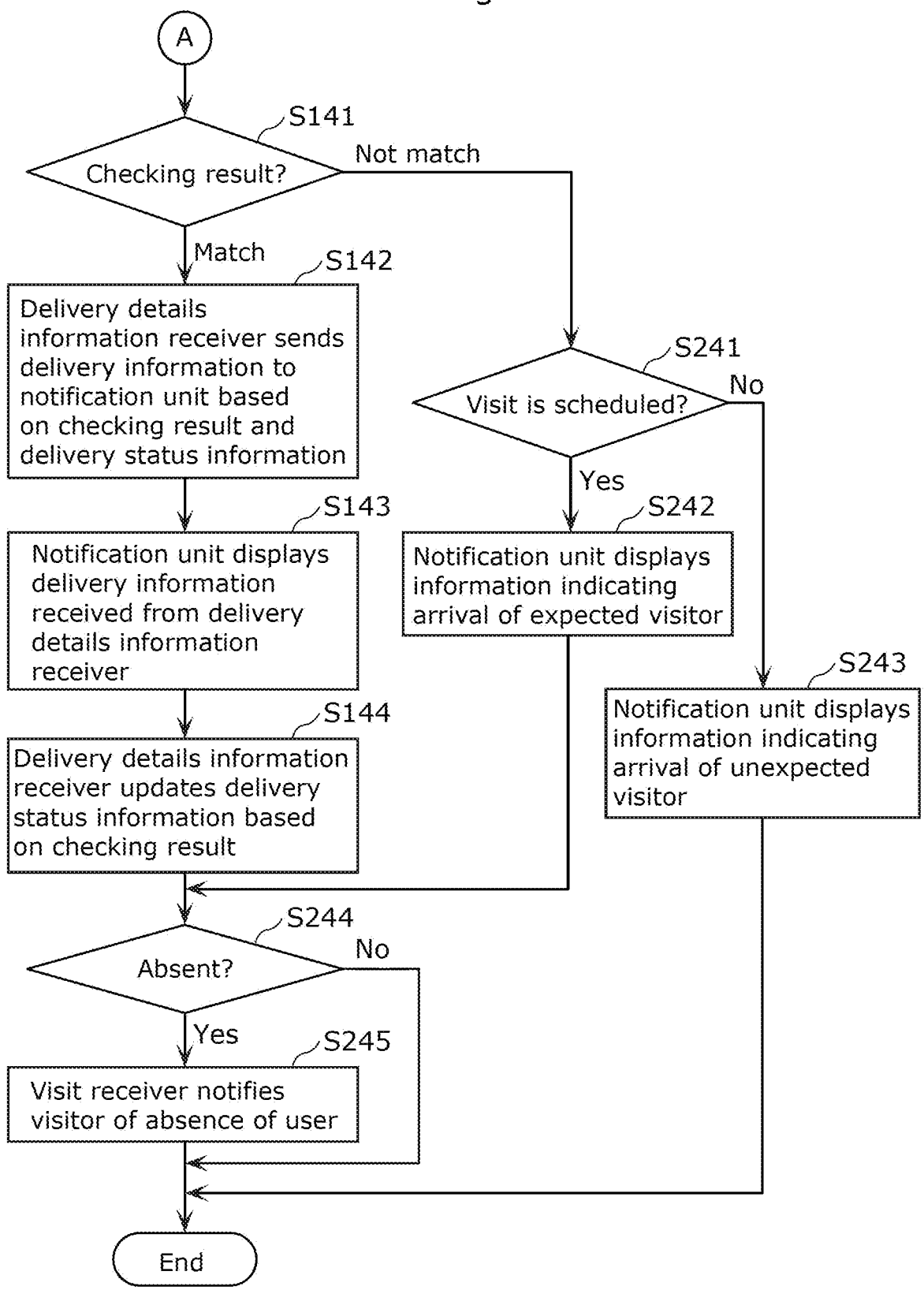
FIG. 18 is a flow chart illustrating the processing of a notification system according to Embodiment 3.

The processing of notification system 400 according to the present embodiment will be described with reference to FIG. 18. FIG. 18 is a flow chart illustrating the processing of notification system 400 according to Embodiment 3.

When the face image of visitor 50 does not match any piece of the deliverer's face information (not match at S141), notification device 410 obtains the visit schedule information on a visitor to building 10 for a predetermined period, and determines whether the visit date and time of visitor 50 is included in a predetermined time range including the expected visit date and time (S241). The visit schedule information includes the first visit schedule information indicating the expected delivery date and time of an article, and the second visit schedule information indicating the expected visit date and time of a visitor different from the deliverer of the article. The first visit schedule information is, for example, the delivery status information shown in FIG. 4E. The predetermined time range may be experientially or experimentally determined in advance, and is stored in advance in, for example, a memory.

Here, when the visit date and time of the visitor is included in the predetermined time range including the expected visit date and time (Yes at S241), notification unit 406 displays the visit information indicating the arrival of the expected visitor (S242). For example, notification unit 406 displays textual information such as "The expected visitor has arrived", or "Mr./Ms. A has arrived". On the other hand, when the visit date and time of the visitor is not included in the predetermined time range including the expected visit date and time (No at S241), notification unit 406 displays the visit information indicating the arrival of an unexpected visitor (S243), and the processing is terminated. For example, notification unit 406 displays textual information such as "An unexpected visitor has arrived", or "Someone has arrived".

After step S144 or step S242, notification device 410 determines whether user 20 is out of building 10 (S244). For example, notification device 410 determines whether user 20 is absent, based on schedule information of user 20. Alternatively, notification device 410 may determine that user 20 is absent when the response of user 20 is not detected during a predetermined time after notification of the delivery information or the visit information. The response of the user can be detected based on data obtained from sensors located inside building 10 or based on whether the user has operated notification device 410.

Here, when user 20 is absent (Yes at S244), visit receiver 402 notifies visitor 50 of the absence of user 20 (S245), and the processing is terminated.

It is to be noted that in the notification of the delivery information or the visit information at steps S143, S242, and S243, the delivery information or the visit information may be provided through voice instead of the display. Alternatively, sound or music may be provided together with the display of the delivery information or the visit information.

Moreover, in the notification of the delivery information or the visit information at steps S143, S242, and S243, the first, second, and third notification methods different from one another may be used, respectively. For example, different notification sound may be provided in the first, second, and third notification methods. Moreover, for example, information may be displayed in different color in the first, second, and third notification methods.

[Advantageous Effects, Etc.]

As described above, in the control method for notification system 400 according to the present embodiment, in (d), the user is notified of the delivery information using a first notification method, and the control method may further include: (h) obtaining information on visit schedule of one or more expected visitors 50 to building 10 for a predetermined period, and the information on visit schedule includes first visit schedule information indicating expected delivery date and time of the article and second visit schedule information indicating expected visit date and time of an expected visitor different from the deliverer of the article; (i) when visitor 50 is not verified to be the deliverer and visit date and time of visitor 50 is included in a predetermined time range including the expected visit date and time, notifying, by notification device 410, the user of visit information using a second notification method, and the visit information indicates arrival of visitor 50 to building 10; and (j) when visitor 50 is not verified to be the deliverer and the visit date and time of visitor 50 is not included in the predetermined time range including the expected visit date and time, notifying, by notification device 410, the user of the visit information using a third notification method.

With this, it is possible to use a different notification method for the deliverer, the expected visitor, and an unexpected visitor. Accordingly, user 20 can easily know an unexpected visitor, and thus it is possible to improve the security.

Moreover, in the example of the notification using the third method, visitor 50 is not the expected visitor, and thus the notification of the absence of user 20 may increase the security risk. Accordingly, for example, when the response of the user cannot be detected during a predetermined time after the notification using the first method and the second method, visitor 50 is notified of, through the visit receiver, information indicating that the user is absent, but after the notification using the third method, visitor 50 is not notified that the user is absent, regardless of the response of the user.

With this, it is possible to suppress the increase in the security risk and improve the convenience of visitor 50.

Embodiment 4

Next, Embodiment 4 will be described. Embodiment 4 differs from the foregoing embodiments in that an application program for face checking can be switched for each delivery company. The present embodiment will be described below mainly in terms of differences from Embodiment 1.

It is to be noted that the configuration of notification system 400 according to the present embodiment is similar to that of Embodiment 1 described above, and thus its drawings and descriptions are omitted.

[Processing of Notification System 400]

The processing of notification system 400 according to the present embodiment will be described with reference to FIG. 19. FIG. 19 is a flow chart illustrating the processing of notification system 400 according to Embodiment 4.

After the processing at step S131 through step S135 is performed, face image checker 405 identifies the delivery company (S331). For example, face image checker 405 identifies the delivery company based on, for example, the uniform of the deliverer from the visitor's image captured by camera unit 403.

Subsequently, face image checker 405 launches the application program associated with the identified delivery company among application programs associated with different delivery companies (S332). The application program associated with a delivery company is allowed access to the deliverer's face information of the delivery company. In other words, the application program is allowed access to the deliverer's face information of at least one of the delivery companies, and denied access to the deliverer's face information of the other delivery companies.

The processing at step S136 and/or step S137 is then performed using the launched application program.

It is to be noted that in FIG. 19, the case in which an application program is launched after the delivery company is identified from the image captured by camera unit 403 is taken as an example, but any other cases are also possible. For example, with reference to delivery status information 505 shown in FIG. 4E or the like, face image checker 405 may launch the application program associated with the company ID, based on the expected delivery date and time of the status indicating "not yet arrived". Alternatively, face image checker 405 may obtain location information of the deliverer from delivery company server 200 to launch the application program when the deliverer comes near building 10. Alternatively, a message is sent from delivery company server 200 to notification system 400 when the deliverer checks the article using a terminal in front of building 10, and the application program may be launched based on the message.

[Advantageous Effects, etc.]

As described above, the control method for notification system 400 according to the present embodiment further includes, prior to (c), (k) identifying a delivery company related to the visitor from the camera image of visitor 50 captured by camera 403, and in (c), the face information and the camera image may be compared using an application program associated with the delivery company identified.

With this, it is possible to automatically switch the application program when the application program needs to be switched according to the delivery company.

Embodiment 5

Next, Embodiment 5 will be described. In the present embodiment, a service delivery system for providing a service including notification of delivery information will be described.

[Total Image of Service to be Provided]

Figure 20A:
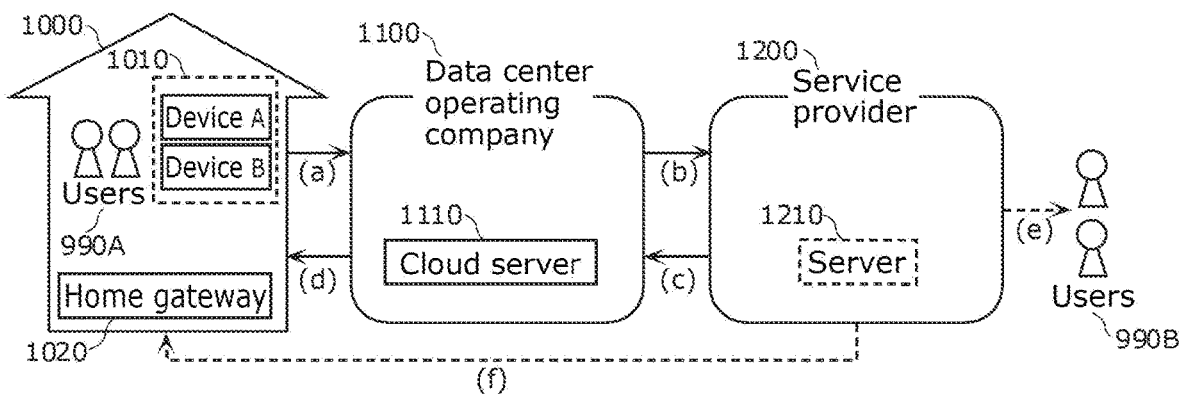
FIG. 20A illustrates a total image of a service delivery system according to Embodiment 5.

FIG. 20A illustrates a total image of a service delivery system according to Embodiment 5.

Group 1000 is, for example, a company, an organization, or a family regardless of the size. In group 1000, there are device A and device B included in devices 1010, and home gateway 1020. For example, device A is notification device 410b or intercom device 420 according to Embodiment 1 as described above. Devices 1010 also includes a device accessible to the Internet (e.g., a smart phone, a PC, a TV, etc.) and a device inaccessible to the Internet by itself (e.g., a lighting fixture, a washing machine, etc.). A device accessible to the Internet via home gateway 1020 may be also included even when the device is the device inaccessible to the Internet by itself. In group 1000, there are also users 990A who use devices 1010.

Figure 20B:
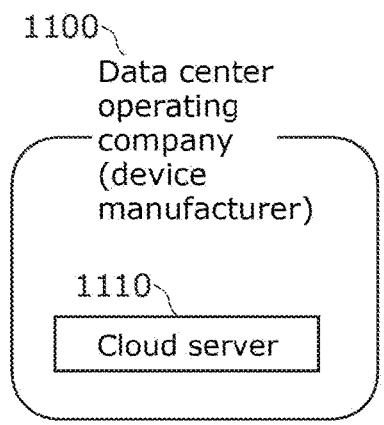
FIG. 20B illustrates one example of a data center operating company according to Embodiment 5.
Figure 20C:
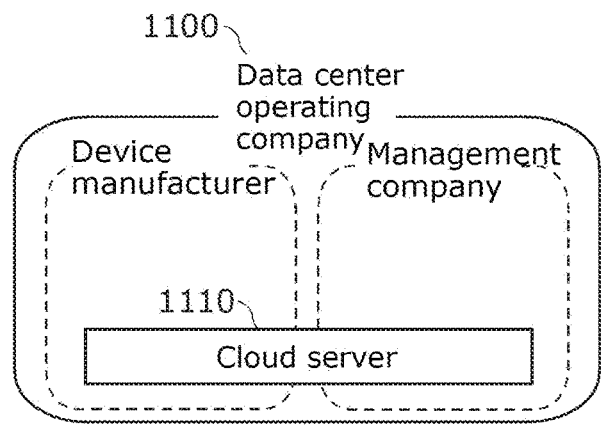
FIG. 20C illustrates another example of the data center operating company according to Embodiment 5.

In data center operating company 1100, there is cloud server 1110. Cloud server 1110 refers to a virtual server that cooperates with various devices via the Internet. For example, cloud server 1110 is cloud server 410a according to Embodiment 1 as described above. Cloud server 1110 mainly manages huge amounts of data (big data) difficult to be handled by a general database management tool or the like. Data center operating company 1100 performs data management, management of cloud server 1110, data center operation for the data management or the cloud server management, etc. Tasks performed by data center operating company 1100 will be described below in detail. Here, data center operating company 1100 is not limited to a company that performs only data management, operation of cloud server 1110, or the like. For example, when a device manufacturer develops and manufactures one device among devices 1010 and also performs data management or management of cloud server 1110, the device manufacture corresponds to data center operating company 1100 (FIG. 20B). Moreover, the number of data center operating companies 1100 is not limited to one. For example, when a device manufacturer and another management company perform data management or management of cloud server 1110 in a cooperative or shared manner, it is assumed that both or either one of them corresponds to data center operating company 1100 (FIG. 20C).

Service provider 1200 has server 1210. The term "server 1210" includes, for example, a memory in a personal computer regardless of the size. Moreover, the service provider may not have server 1210.

It is to be noted that home gateway 1020 is not always required in the above service. For example, when cloud server 1110 performs all data management, home gateway 1020 is unnecessary. Moreover, like the case where all devices in the home are connected to the Internet, there may be a case where no device inaccessible to the Internet by itself is in the home.

Next, information flow in the above service will be described.

Firstly, device A or device B in group 1000 sends information obtained by each device to cloud server 1110 of data center operating company 1100. Cloud server 1110 collects information from device A or device B ((a) in FIG. 20A). Here, the collected information is information indicating, for example, an operating state, operating date and time, an operational mode, a location, or the like of each of devices 1010. For example, the collected information is TV viewing history, recording appointment information for a recorder, operating date and time and/or an amount of clothes for a washing machine, date and time when the door is opened and closed and/or the number of times that the door is opened and closed for a refrigerator, an amount of foods in a refrigerator, etc., but any other information is also possible as long as the information can be obtained from any of the devices. The information may be directly provided to cloud server 1110 from devices 1010 themselves via the Internet. Moreover, the information may be temporarily collected in home gateway 1020 from devices 1010, and the information may be provided from home gateway 1020 to cloud server 1110.

Next, cloud server 1110 of data center operating company 1100 provides the collected information to service provider 1200 on a constant unit basis. Here, the constant unit may be a unit on which basis data center operating company 1100 can organize the collected information and provide the organized information to service provider 1200, or a unit which is required by service provider 1200. Although the constant unit, the unit need not be always constant. The amount of information to be provided may vary depending on the situation. The information is stored in server 1210 owned by service provider 1200, as needed ((b) of FIG. 20A). Service provider 1200 then organizes the information into information appropriate to the service to be provided to the users, and provides the organized information to the users. The target users may be users 990A who use devices 1010 or outside users 990B. The service may be provided to the users, for example, directly from the service provider ((e) and (f) of FIG. 20A). The service may also be provided to the users, for example, via cloud server 1110 of data center operating company 1100 again ((c) and (d) of FIG. 20A). Moreover, cloud server 1110 of data center operating company 1100 may organize the information into information appropriate to the service to be provided to the users, and provides the organized information to service provider 1200.

It is to be noted that users 990A may be different from or identical to users 990B.

The technologies described in the foregoing aspects can be implemented, for example, by the following cloud service types. However, the types by which the technologies described in the foregoing aspects are implemented are not limited to the followings.

[Service Type 1: Company has Own Data Center]

Figure 21:
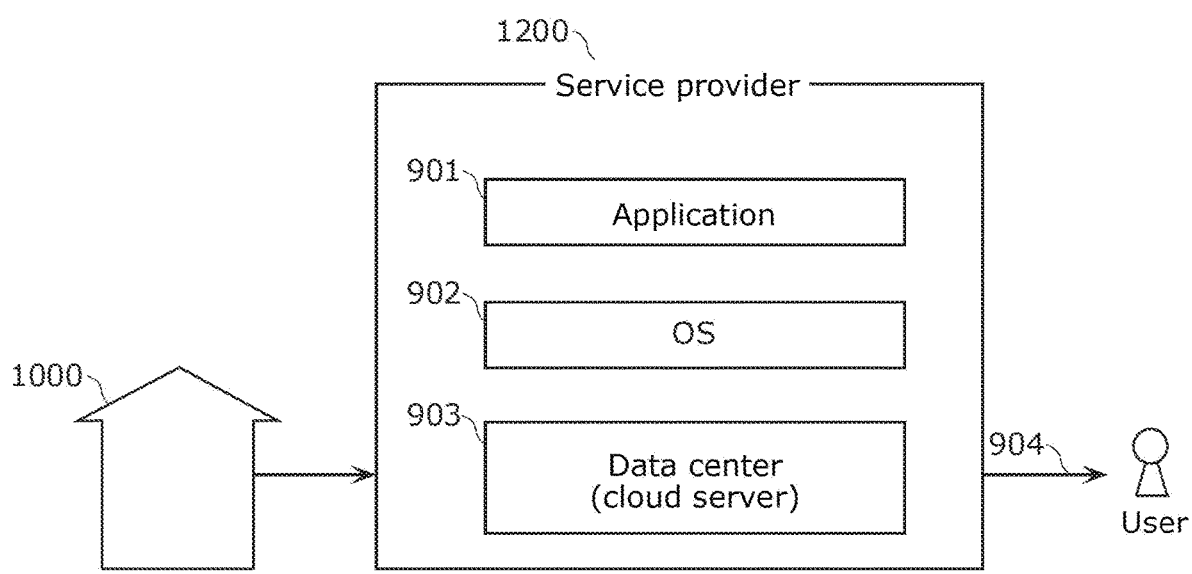
FIG. 21 illustrates service type 1 (company has its own data center) according to Embodiment 5.

FIG. 21 illustrates service type 1 (company has its own data center). This type is a type in which service provider 1200 obtains information from group 1000 and provides the service to the user. In this type, service provider 1200 has the function of the data center operating company. In other words, the service provider has cloud server 1110 which manages big data. Accordingly, there is no data center operating company.

In this type, service provider 1200 operates and manages data center 903 (cloud server 1110). Service provider 1200 also manages OS 902 and application 901. Service provider 1200 provides service 904 using OS 902 and application 901 managed by service provider 1200.

[Service Type 2: Use of IaaS]

Figure 22:
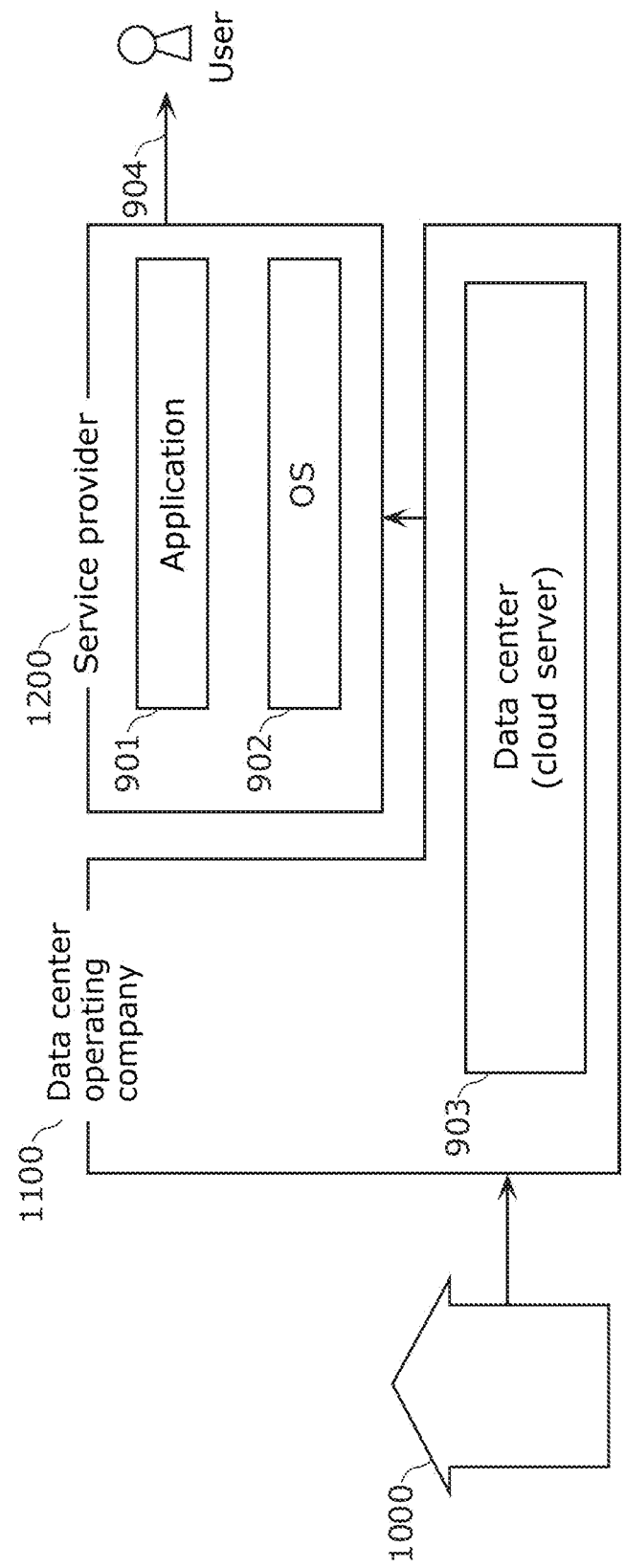
FIG. 22 illustrates service type 2 (use of IaaS) according to Embodiment 5.

FIG. 22 illustrates service type 2 (use of IaaS). Here, IaaS is an abbreviation of Infrastructure as a Service, and a cloud-service providing model which provides, as a service via the Internet, the infrastructure itself for configuring and operating a computer system.

In this type, data center operating company 1100 operates and manages data center 903 (cloud server 1110). Moreover, service provider 1200 manages OS 902 and application 901. Service provider 1200 provides service 904 using OS 902 and application 901 managed by service provider 1200.

[Service Type 3: Use of PaaS]

Figure 23:
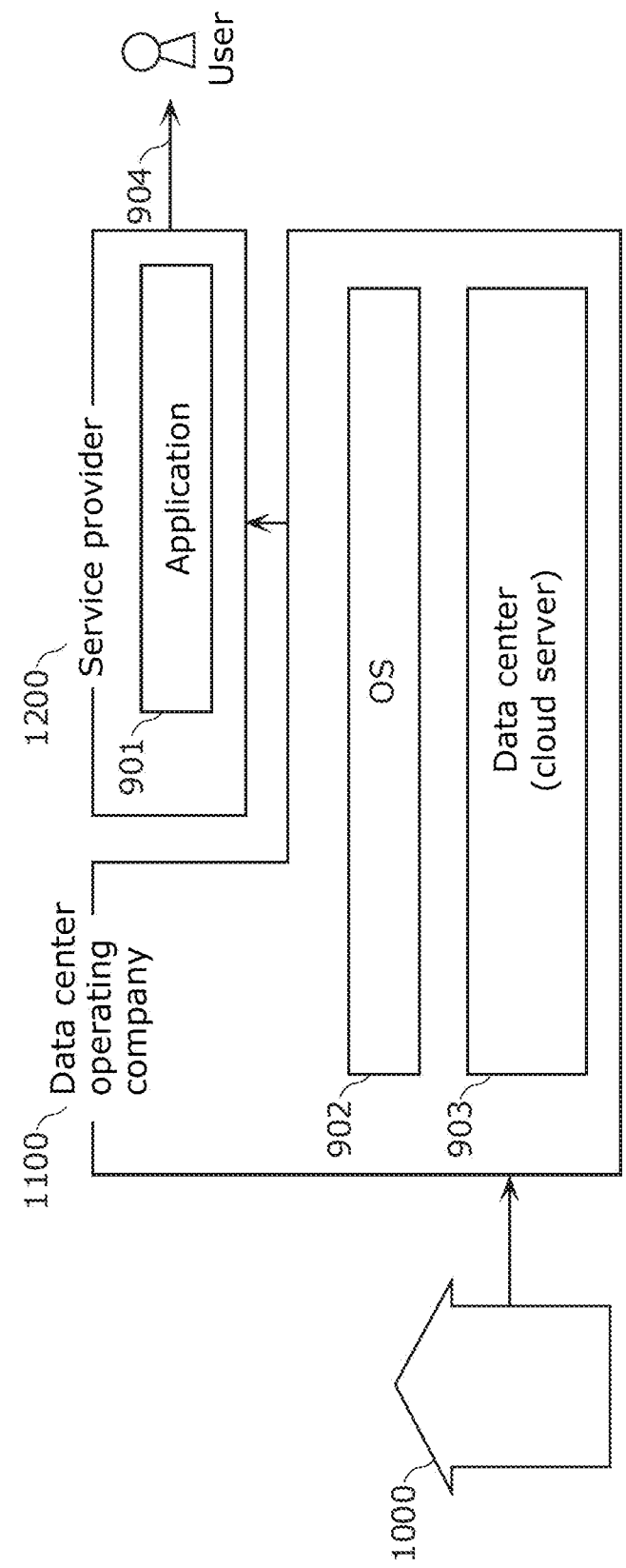
FIG. 23 illustrates service type 3 (use of PaaS) according to Embodiment 5.

FIG. 23 illustrates service type 3 (use of PaaS). Here, PaaS is an abbreviation of Platform as a Service, and a cloud-service providing model which provides, as a service via the Internet, the base platform for configuring and operating software.

In this type, data center operating company 1100 manages OS 902, and operates and manages data center 903 (cloud server 1110). Moreover, service provider 1200 manages application 901. Service provider 1200 provides service 904 using OS 902 managed by data center operating company 1100 and application 901 managed by service provider 1200.

[Service Type 4: Use of SaaS]

Figure 24:
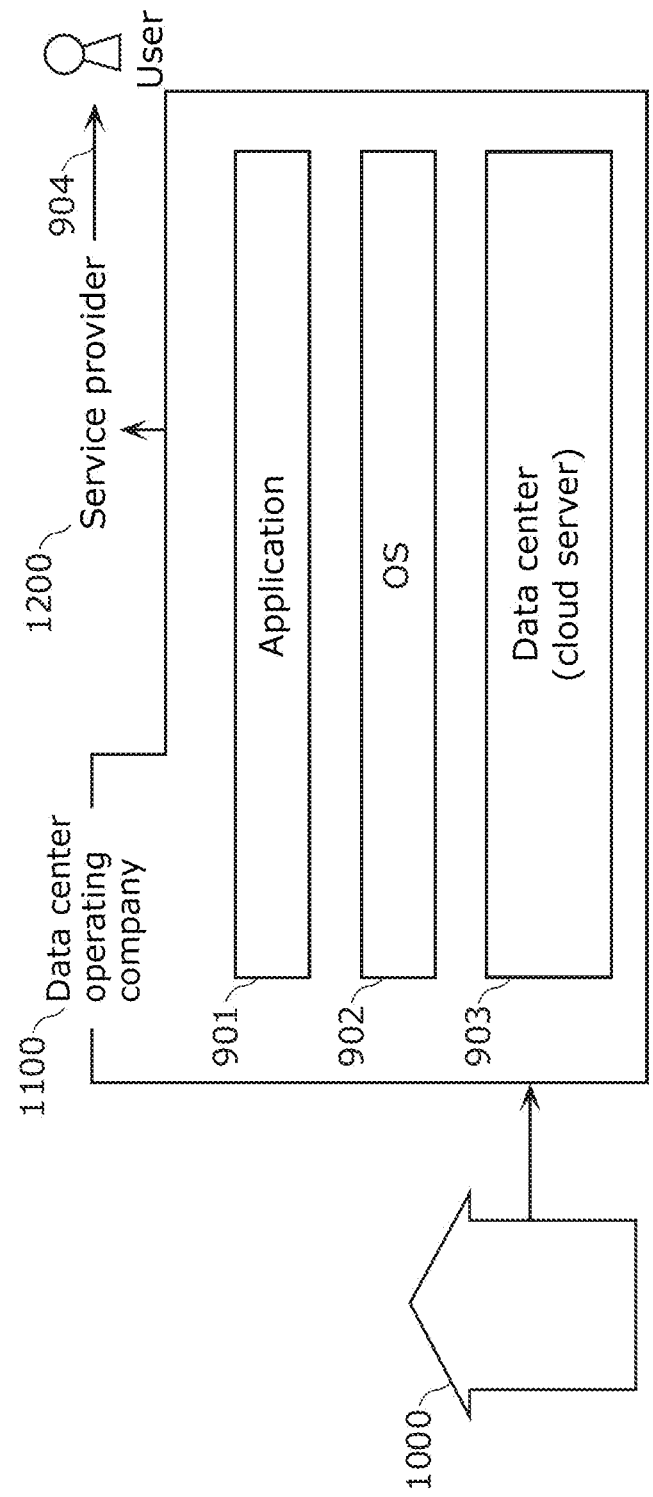
FIG. 24 illustrates service type 4 (use of SaaS) according to Embodiment 5.

FIG. 24 illustrates service type 4 (use of SaaS). Here, SaaS is an abbreviation of Software as a Service. For example, SaaS is a cloud-service providing model having a function in which an application provided by a platform provider who owns a data center (a cloud server) is available to a company/person (the user) which/who owns no data center (a cloud server) via a network such as the Internet.

In this type, data center operating company 1100 manages application 901 and OS 902, and operates and manages data center 903 (cloud server 1110). Moreover, service provider 1200 provides service 904 using OS 902 and application 901 managed by data center operating company 1100.

In any of the foregoing service types, it is assumed that service provider 1200 provides the service. Moreover, for example, the service provider or the data center operating company may develop an OS, an application, a database of big data, or the like by itself, or may order an OS, an application, a database of big data, or the like to the third party.

Other Embodiments

As described above, the information processing system according to one or more aspects of the present disclosure have been described based on the embodiments, but the present disclosure is not limited to these embodiments. Various modifications to the embodiments that can be conceived by those skilled in the art, and forms configured by combining components in different embodiments without departing from the spirit of the present disclosure may be included in the scope of the one or more aspects of the present disclosure.

For example, one aspect of the present disclosure may be not only such an information processing system, but also a display control method including, as steps, processes performed by a processor in the information processing system. Moreover, one aspect of the present disclosure may be a computer program which causes a computer to execute each distinctive step in the display control method. Moreover, one aspect of the present disclosure may be a non-transitory computer-readable recording medium having such a program recorded thereon.

Such a program causes a computer to (a) obtain, using a sensor, a user state indicating whether the user is cooking using cooking appliance when an image of a deliverer who delivers an item to the building of the user is captured by a camera installed at the entrance of the building, (b) obtain details information on the item, (c) obtain at least one suggestion associated with the user state and the details information on the item, and (d) display, on a display terminal disposed in the building, the image of the deliverer, the details information of the item, and the at least one suggestion.

In the present disclosure, all or a part of the units or the devices, or all or a part of the functional blocks in the block diagram shown in FIG. 2 may be implemented by one or more electronic circuits including a semiconductor device, a semiconductor integrated circuit (IC), or a large scale integration (LSI). The LSI or the IC may be integrated into one chip, or may be configured by combining chips. For example, a functional block other than a storage element may be integrated into one chip. The name of LSI or IC is used here, but the name varies depending on the degree of integration. A system LSI, a very large scale integration (VLSI) or ultra large scale integration (ULSI) may be also used. A field programmable gate array (FPGA) capable of being programed after manufacturing of a LSI, or a reconfigurable logic device capable of reconfiguring connection relationships in a LSI or setting up circuit partitions in a LSI can be also used for the same purpose.

Furthermore, all or a part of the function or the operation of a unit, a device, or a part of the device may be performed by a software process. In this case, the software is recorded on a non-transitory recording medium such as one or more ROMs, optical disks, or hard disk drives. When the software is executed by a processor, the software causes the processor and the peripheral devices to perform the specific function in the software. The system or the device may include one or more non-transitory recording mediums having software recorded thereon, processors, and necessary hardware devices such as interfaces.

INDUSTRIAL APPLICABILITY

The present disclosure is applicable to a notification system which notifies a user of delivery information when a deliverer who delivers an article has been arrived at a building.

The invention claimed is:

1. A control method for a notification system including a notification device located inside a building, the control method comprising:
   (a) obtaining face information of a deliverer of an article from an outside server;
   (b) obtaining a camera image of a face of a visitor to the building, the camera image being captured by a camera disposed outside the building;
   (c) verifying whether the visitor is the deliverer by comparing the face information and the camera image; and
   (d) notifying, by the notification device, a user of delivery information indicating that the deliverer of the article has arrived at the building based on the comparing of the face information and the camera image, and when the visitor is verified to be the deliverer.

2. The control method according to claim 1, wherein a sensor for sensing the user is located inside the building, the control method further comprises:
   (e) determining whether the user is doing a predetermined action, based on an output signal of the sensor, and
   in (d), a notification method for notifying the delivery information is switched according to a result of the determining in (e).

3. The control method according to claim 2, wherein
the notification system includes a plurality of notification devices,
the sensor senses each of a plurality of users,
the control method further comprises:
 (f) selecting at least one user who is not doing the predetermined action from among the users based on the output signal of the sensor, and
in (d), the at least one user selected is notified of the delivery information by at least one of the notification devices that is located within a predetermined range from the at least one user selected.

4. The control method according to claim 1, further comprising:
 (g) when the visitor is not verified to be the deliverer, notifying, by the notification device, the user of visit information using a second notification method, the visit information indicating arrival of the visitor to the building, wherein
in (d), the user is notified of the delivery information using a first notification method different from the second notification method.

5. The control method according to claim 1, wherein
in (d), the user is notified of the delivery information using a first notification method, and
the control method further comprises:
 (h) obtaining information on visit schedule of one or more expected visitors to the building for a predetermined period, the information on visit schedule including first visit schedule information indicating expected delivery date and time of the article and second visit schedule information indicating expected visit date and time of an expected visitor different from the deliverer of the article;
 (i) when the visitor is not verified to be the deliverer and visit date and time of the visitor is included in a predetermined time range including the expected visit date and time, notifying, by the notification device, the user of visit information using a second notification method, the visit information indicating arrival of the visitor to the building; and
 (j) when the visitor is not verified to be the deliverer and the visit date and time of the visitor is not included in the predetermined time range including the expected visit date and time, notifying, by the notification device, the user of the visit information using a third notification method.

6. The control method according to claim 1, further comprising:
prior to (c), (k) identifying a delivery company related to the visitor from the camera image of the visitor captured by the camera, wherein
in (c), the face information and the camera image are compared using an application program associated with the delivery company identified among a plurality of application programs.

7. A notification system, comprising:
a communication unit that obtains face information of a deliverer of an article from an outside server, and obtains a camera image of a face of a visitor to the building, the camera image being captured by a camera disposed outside the building;
a face image checker that verifies whether the visitor is the deliverer by comparing the face information and the camera image; and
a notification unit that notifies a user of delivery information indicating that the deliverer of the article has arrived at the building based on the comparing of the face information and the camera image, and when the visitor is verified to be the deliverer.

* * * * *